United States Patent
Bai

(10) Patent No.: US 7,734,190 B2
(45) Date of Patent: Jun. 8, 2010

(54) SYSTEM AND METHOD FOR GENERATING OPTICAL RETURN-TO-ZERO SIGNALS WITH DIFFERENTIAL BI-PHASE SHIFT

(75) Inventor: Yu Sheng Bai, Los Altos Hills, CA (US)

(73) Assignee: FutureWei Technologies, Inc., Plano, TX (US)

( * ) Notice: Subject to any disclaimer, the term of this patent is extended or adjusted under 35 U.S.C. 154(b) by 913 days.

(21) Appl. No.: 11/344,958

(22) Filed: Jan. 31, 2006

(65) Prior Publication Data

US 2006/0193230 A1    Aug. 31, 2006

Related U.S. Application Data

(60) Provisional application No. 60/656,775, filed on Feb. 24, 2005.

(51) Int. Cl.
*H04B 10/04* (2006.01)

(52) U.S. Cl. .................. 398/185; 398/182; 398/183; 398/186; 398/188; 398/201

(58) Field of Classification Search .................. 398/182, 398/183, 185–188, 201
See application file for complete search history.

(56) References Cited

U.S. PATENT DOCUMENTS

| | | | |
|---|---|---|---|
| 5,543,952 A * | 8/1996 | Yonenaga et al. ........... | 398/185 |
| 5,625,722 A | 4/1997 | Froberg et al. | |
| 5,917,638 A | 6/1999 | Franck et al. | |

(Continued)

FOREIGN PATENT DOCUMENTS

CN    1458759    11/2003

(Continued)

OTHER PUBLICATIONS

Forzati, Marco et al., "Reduction Of Intrachannel Four-Wave Mixing Using the Alternate-Phase RZ Modulation Format," IEEE Photonics Technology Letters, vol. 14, No. 9, pp. 1285-1287, Sep. 2002.

(Continued)

*Primary Examiner*—Li Liu
(74) *Attorney, Agent, or Firm*—Townsend and Townsend and Crew LLP

(57) ABSTRACT

A system and method for generating an optical return-to-zero signal. The system includes an electro-optical conversion system. The electro-optical conversion system is configured to receive an input electrical non-return-to-zero signal, process information associated with the input electrical non-return-to-zero signal, and generate a first electrical signal and a second electrical signal based on at least information associated with the input electrical non-return-to-zero signal. Additionally, the electro-optical conversion system is configured to delay a second electrical signal with respect to the first electrical signal by a predetermined period of time, process information associated with the first electrical signal and the delayed second electrical signal, and generate an output optical return-to-zero signal based on at least information associated with the first electrical signal and the delayed second electrical signal. The output optical return-to-zero signal is an optical differential return-to-zero signal, and the output optical return-to-zero signal is substantially free from any frequency chirp.

15 Claims, 16 Drawing Sheets

U.S. PATENT DOCUMENTS

| | | | |
|---|---|---|---|
| 6,188,497 | B1 | 2/2001 | Franck et al. |
| 6,535,316 | B1 | 3/2003 | Mizuhara |
| 6,542,280 | B2 | 4/2003 | Walklin |
| 6,559,996 | B1* | 5/2003 | Miyamoto et al. .......... 398/183 |
| 6,623,188 | B1* | 9/2003 | Dimmick et al. ............ 398/182 |
| 6,667,989 | B1 | 12/2003 | Sekii et al. |
| 6,760,142 | B2 | 7/2004 | Leuthold et al. |
| 7,386,239 | B2* | 6/2008 | Lee et al. .................... 398/183 |
| 2002/0171903 | A1 | 11/2002 | Walklin |
| 2003/0156774 | A1* | 8/2003 | Conradi ........................ 385/2 |
| 2004/0165893 | A1 | 8/2004 | Winzer |

FOREIGN PATENT DOCUMENTS

| | | |
|---|---|---|
| CN | 1567867 | 1/2005 |
| CN | 1642175 | 1/2005 |
| EP | 0 701 338 A | 3/1996 |
| EP | 1 059 744 A | 12/2000 |
| WO | WO 2004/051898 | 6/2004 |

OTHER PUBLICATIONS

Kaiser, W. et al., "Reduced Complexity Optical Duobinary 10-Gb/s Transmitter Setup Resulting In An Increased Transmission Distance," IEEE Photonics Technology Letters, vol. 13, No. 8, pp. 884-886, Aug. 2001.

Miyamoto, Y. et al., "320 Gbit/s (8×40 Gbit/s) WDM Transmission Over 367km With 120km Repeater Spacing Using Carrier-Suppressed Return-To-Zero Format," Electronics Letters, vol. 35, No. 23, pp. 2041-2042, Nov. 11, 1999.

European Search Report of EP Application No. 06705681.2-2415, dated Feb. 5, 2008, 10 pages total.

\* cited by examiner

SYSTEM AND METHOD FOR GENERATING OPTICAL RETURN-TO-ZERO SIGNALS WITH DIFFERENTIAL BI-PHASE SHIFT

CROSS-REFERENCES TO RELATED APPLICATIONS

This application claims priority to U.S. Provisional Application No. 60/656,775, filed Feb. 24, 2005, which is incorporated by reference herein.

The following two commonly-owned co-pending applications are hereby incorporated by reference in their entirety for all purposes:

1. U.S. patent application Ser. No. 11/336,658, in the name of Yu Sheng Bai, titled, "System and Method for Generating Optical Return-to-Zero Signals with Alternating Bi-Phase Shift,"; and 2. U.S. patent application Ser. No. 11/366,619, in the name of Yu Sheng Bai, titled, "System and Method for Generating Optical Return-to-Zero Signals with Alternating Bi-Phase Shift and Frequency Chirp,".

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates in general to telecommunication techniques. More particularly, the invention provides a system and method for generating optical return-to-zero signals with differential bi-phase shift. Merely by way of example, the invention is described as it applies to optical networks, but it should be recognized that the invention has a broader range of applicability.

Telecommunication techniques have progressed through the years. As merely an example, optical networks have been used for conventional telecommunications in voice and other applications. The optical networks can transmit multiple signals of different capacities. For example, the optical networks terminate signals, multiplex signals from a lower speed to a higher speed, switch signals, and transport signals in the networks according to certain definitions.

In optical communications, an optical signal may transmit a long distance, such as hundreds or even thousands of kilometers, in optical fiber links. The quality of received signals often can be improved by using return-to-zero (RZ) modulations instead of non-return-to-zero (NRZ) modulations. For example, a signal under return-to-zero modulation includes logic low and high states, such as ones represented by "0" and "1" respectively. The signal state often is determined by the voltage during one part of a bit period, and the signal returns to a resting state during another part of the bit period. As an example, the resting state is represented by zero volt. In another example, a signal under non-return-to-zero modulation includes logic low and high states, such as ones represented by "0" and "1" respectively. The signal state often is determined by the voltage during a bit period without the signal returning to a resting state during at least a part of the bit period.

The return-to-zero modulations usually can provide better resistance to signal noises than the non-return-to-zero modulations. Additionally, the isolated RZ pulses often experience nearly identical nonlinear distortions during transmission, which can be at least partially mitigated through proper dispersion compensation schemes. Hence RZ signals usually are more resistant to nonlinear distortions than NRZ signals.

Among complex RZ signals, the optical carrier-suppressed return-to-zero (CSRZ) signals can provide strong transmission capabilities. For example, the CSRZ signals have alternating bi-phase shifts between adjacent bits, and are less affected by inter-symbol interference than the simple RZ signals, which often are intensity modulated without phase modulation. Thus the CSRZ signals are more tolerant for both dispersions and nonlinear distortions.

FIG. 1 is a simplified conventional system for generating CSRZ signals. The system 100 includes an NRZ source 110, an NRZ data driver 120, a CW diode laser 130, a data modulator 140, a clock driver 150, a phase shifter 155, and a clock modulator 160. The data modulator 140 and the clock modulator 160 each are an EO modulator. The EO modulator 160 is biased at null and driven by a half-rate data clock signal generated by the clock driver 150. In response, the EO modulator 160 can generate optical clock pulses. As shown in FIG. 1, the conventional system 100 for generating CSRZ signals often is complex and expensive.

Hence it is highly desirable to improve techniques for generating return-to-zero signals.

BRIEF SUMMARY OF THE INVENTION

The present invention relates in general to telecommunication techniques. More particularly, the invention provides a system and method for generating optical return-to-zero signals with differential bi-phase shift. Merely by way of example, the invention is described as it applies to optical networks, but it should be recognized that the invention has a broader range of applicability.

According to one embodiment of the present invention, a system for generating an optical return-to-zero signal includes an electro-optical conversion system. The electro-optical conversion system is configured to receive an input electrical non-return-to-zero signal, process information associated with the input electrical non-return-to-zero signal, and generate a first electrical signal and a second electrical signal based on at least information associated with the input electrical non-return-to-zero signal. Additionally, the electro-optical conversion system is configured to delay a second electrical signal with respect to the first electrical signal by a predetermined period of time, process information associated with the first electrical signal and the delayed second electrical signal, and generate an output optical return-to-zero signal based on at least information associated with the first electrical signal and the delayed second electrical signal. The output optical return-to-zero signal is an optical differential return-to-zero signal, and the output optical return-to-zero signal is substantially free from any frequency chirp.

According to another embodiment of the present invention, a system for generating an optical return-to-zero signal includes a coding device configured to receive an input electrical non-return-to-zero signal and generate a coded signal. The coded signal is split into a first signal and a second signal. Additionally, the system includes a time delay device configured to receive the second signal and generate a third signal.

The third signal is delayed with respect to the second signal by a predetermined period of time. Moreover, the system includes a driver configured to receive the first signal and the third signal and generate a driving signal. The driving signal is associated with a difference between the first signal and the third signal. Also, the system includes a light source configured to generate a light, and an electro-optical modulator configured to receive the light and the driving signal, modulate the light with the driving signal, and generate an output optical signal. The third signal at a first time is associated with a result of modulo-2 addition of the second signal at the first time and the third signal at a second time. The second time precedes the first time by the predetermined period of time. The output optical signal is an optical return-to-zero signal.

According to another embodiment of the present invention, a system for generating an optical return-to-zero signal includes a coding device configured to receive an input electrical non-return-to-zero signal and generate a first signal and a second signal, and a time delay device configured to receive the second signal and generate a third signal. The third signal is delayed with respect to the second signal by a predetermined period of time. Additionally, the system includes a combiner configured to receive the first signal and the third signal and generate a fourth signal. The fourth signal is associated with a sum of the first signal and the third signal. Moreover, the system includes a light source configured to generate a light, and an electro-optical modulator configured to receive the light and a driving signal, modulate the light with the driving signal, and generate an output optical signal. The third signal at a first time is associated with a result of modulo-2 addition of the second signal at the first time and the third signal at a second time, the second time preceding the first time by the predetermined period of time. The driving signal is proportional to the fourth signal, and the output optical signal is an optical return-to-zero signal.

According to yet another embodiment of the present invention, a system for generating an optical return-to-zero signal includes a coding device configured to receive an input electrical non-return-to-zero signal and generate a coded signal. The coded signal is split into a first input signal and a second input signal. Additionally, the system includes a time delay device configured to receive the second input signal and generate a third input signal. The third input signal is delayed with respect to the second input signal by a predetermined period of time. Moreover, the system includes a driver configured to receive the first input signal and the third input signal and generate a first driving signal and a second driving signal. Each of the first driving signal and the second driving is associated with a difference between the first input signal and the third input signal. Also, the system includes a light source configured to generate a light, and an electro-optical modulator configured to receive the light, the first driving signal, and the second driving signal, modulate the light with the first driving signal and the second driving signal, and generate an output optical signal. The third input signal at a first time is associated with a result of modulo-2 addition of the second input signal at the first time and the third input signal at a second time, the second time preceding the first time by the predetermined period of time. The output optical signal is an optical return-to-zero signal.

According to yet another embodiment of the present invention, a system for generating an optical return-to-zero signal includes a coding device configured to receive an input electrical non-return-to-zero signal and generate a first input signal and a second input signal, and a time delay device configured to receive the second input signal and generate a third input signal. The third input signal is delayed with respect to the second input signal by a predetermined period of time. Additionally, the system includes a combiner configured to receive the first input signal and the third input signal and generate a fourth input signal. The fourth input signal is associated with a sum of the first input signal and the third input signal. Moreover, the system includes a light source configured to generate a light, and an electro-optical modulator configured to receive the light, a first driving signal, and a second driving signal, modulate the light with the first driving signal and the second driving signal, and generate an output optical signal. The third input signal at a first time is associated with a result of modulo-2 addition of the second input signal at the first time and the third input signal at a second time, and the second time precedes the first time by the predetermined period of time. Each of the first driving signal and the second driving signal is proportional to the fourth signal, and the output optical signal is an optical return-to-zero signal.

According to yet another embodiment of the present invention, a system for generating an optical return-to-zero signal includes a coding device configured to receive an input electrical non-return-to-zero signal and generate a coded signal. The coded signal is split into a first input signal and a second input signal. Additionally, the system includes a time delay device configured to receive the second input signal and generate a third input signal. The third input signal is delayed with respect to the second input signal by a predetermined period of time. Moreover, the system includes a light source configured to generate a light, and an electro-optical modulator configured to receive the light, a first driving signal, and a second driving signal, modulate the light with the first driving signal and the second driving signal, and generate an output optical signal. The third input signal at a first time is associated with a result of modulo-2 addition of the second input signal at the first time and the third input signal at a second time, the second time preceding the first time by the predetermined period of time. The first driving signal is proportional to the first input signal in signal strength, and the second driving signal is proportional to the second input signal in signal strength. The output optical signal is an optical return-to-zero signal with a frequency chirp.

Many benefits are achieved by way of the present invention over conventional techniques. Some embodiments of the present invention provide systems and methods for generating optical differential return-to-zero signals. Certain embodiments of the present invention provides systems and methods that separate a pre-coded electrical non-return-to-zero (NRZ) signal into two signals, introduce a delay to one of the two signals relative to the other of the two signals, and then combine the two signals differentially to drive a Mach-Zehnder (MZ) electro-optical (EO) modulator to generate an optical RZ signal with differential bi-phase shift. For example, every "1" pulse has a 180-degree phase shift from its nearest "1" pulses.

Certain embodiments of the present invention can reduce interactions between the pulses that represent a logic high level, regardless of their separation in bit periods. Some embodiments of the present invention provide systems and methods that use only one MZ data modulator to generate the differential RZ (DRZ) signals. Certain embodiments of the present invention can significantly lower the cost of a transmitter for optical DRZ signals. Some embodiments of the present invention can significantly reduce the complexity of a transmitter for optical DRZ signals. Certain embodiments of the present invention can provide optical differential RZ signals that improve dispersion tolerance over conventional optical RZ signals. Some embodiments of the present invention can provide optical differential RZ signals that improve dispersion tolerance over conventional optical NRZ signals. This improvement can be against certain conventional wisdom, with which it is believed that the short pulses in an RZ format should always lead to smaller dispersion tolerance.

Certain embodiments of the present invention can significantly improve reliability of a transmitter for optical DRZ signals. Some embodiments of the present invention can significantly improve performance of a fiber optical transport system. For example, the fiber optical transport system is used for transmission at a high data rate, such as a rate higher than 10 Gbps.

Certain embodiments of the present invention can provide systems and methods that pro-code an electrical non-return-to-zero (NRZ) signal, and then combine differentially the output and the delayed output in order to drive a single drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal. Some embodiments of the present invention can provide systems and methods that pro-code an electrical non-return-to-zero (NRZ) signal, and then combine differentially the output and the delayed output in order to drive a dual drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal.

Certain embodiments of the present invention can provide systems and methods that pro-code an electrical non-return-to-zero (NRZ) signal, and then combine differentially the output and the delayed output with a differential amplifier. The generated signal is used to drive a single drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal. Some embodiments of the present invention can provide systems and methods that pro-code an electrical non-return-to-zero (NRZ) signal, and then combine differentially the output and the delayed output with a differential amplifier. The generated signal is used to drive a dual drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal.

Certain embodiments of the present invention can provide systems and methods that pro-code an electrical non-return-to-zero (NRZ) signal, and then use the output and the delayed output to drive a dual drive Mach-Zehnder modulator in differential configuration. The output of the MZ modulator is an optical RZ signal with differential bi-phase shift and frequency chirp. The intensity of the optical RZ signal represents a logic sequence that is the same as one represented by the NRZ signal.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for generating optical return-to-zero signals with differential bi-phase shift. Merely by way of example, the invention is described as it applies to optical networks, but it should be recognized that the invention has a broader range of applicability.

Figure 1:
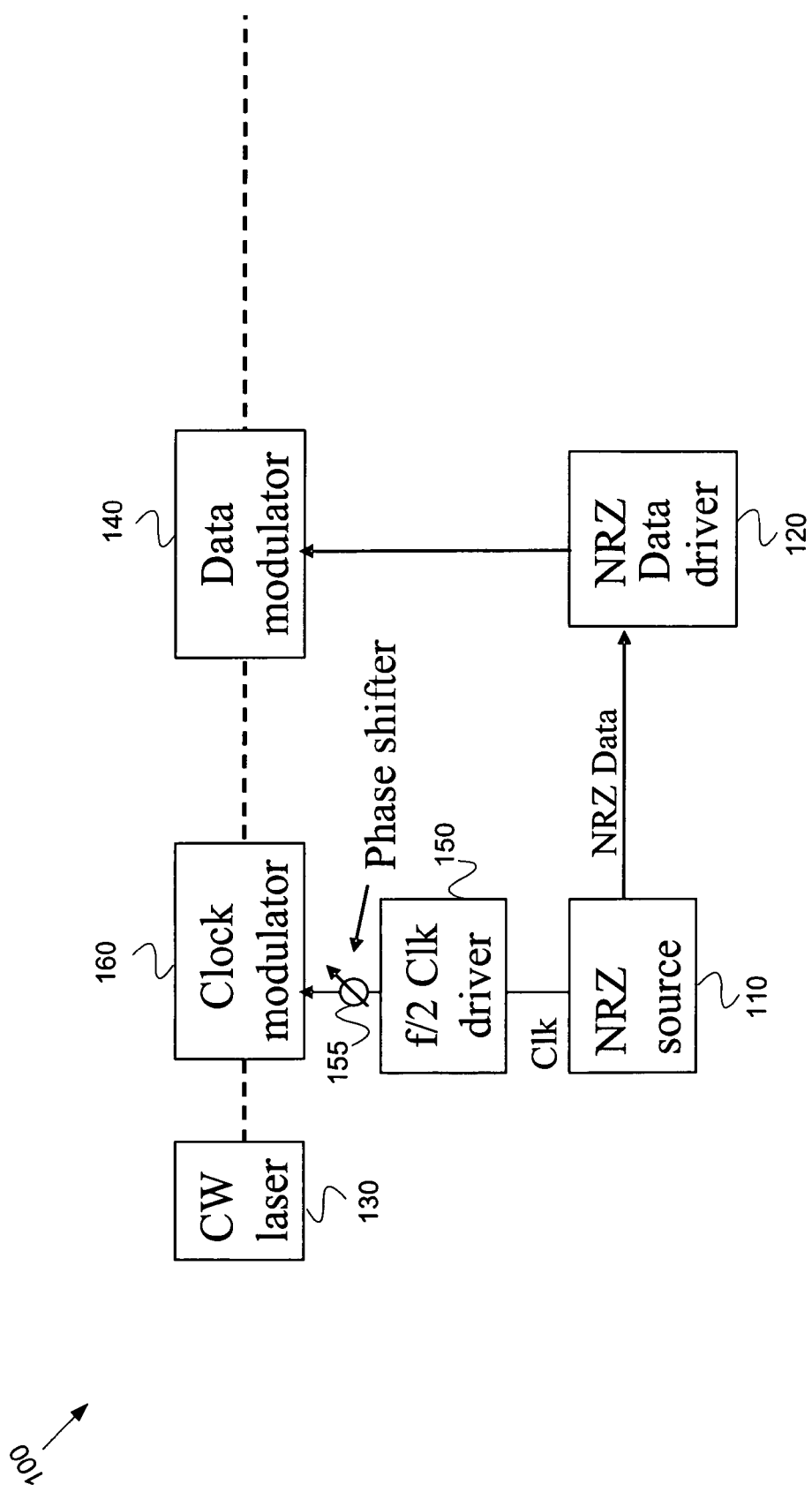
FIG. 1 is a simplified conventional system for generating CSRZ signals.

As shown in FIG. 1, the system 100 uses two EO modulators and related driving circuits to perform optical double modulations. For example, a first MZ modulator is used for clock-pulse modulations, and a second MZ modulator is used for data modulations. The clock pulses received by the first MZ modulator are often generated by nonstandard parts, which can be very expensive. Additionally, the optical data modulations and the optical clock modulations usually need to overlap temporally, so the clock pulses should be kept substantially at the center of the bit slot. But keeping the clock pulses substantially at the center of the bit slot is often difficult to achieve under various operating conditions or over a large temperature range.

Figure 2:
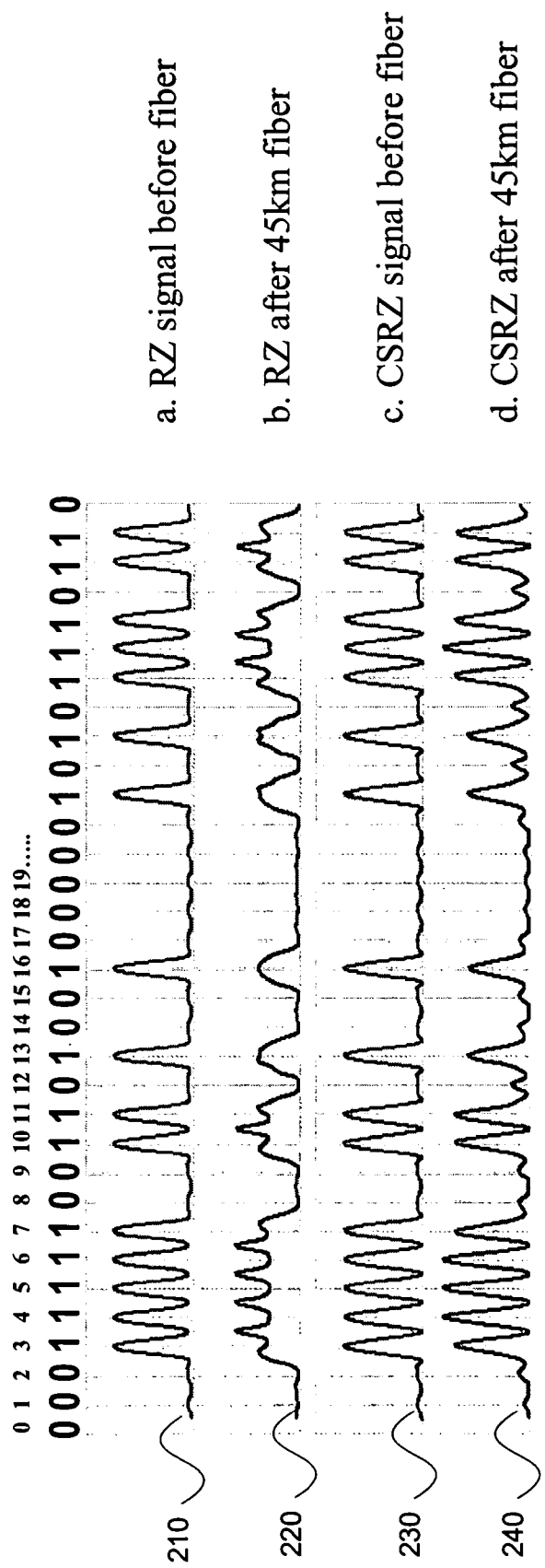
FIG. 2 is a simplified conventional diagram showing dispersion effects on various conventional RZ signals.

FIG. 2 is a simplified conventional diagram showing dispersion effects on various conventional RZ signals. Curve 210 represents a simple RZ signal that is intensity modulated. For example, the simple RZ signal has a 50% duty cycle at 10 Gigabits per second (Gbps). Curve 220 represents the simple RZ signal after 45-kilometer transmission in a single mode fiber. The total dispersion can be calculated as 45×17=765 ps/nm. As shown by the curve 220, because adjacent pulses in the simple RZ signal have the same phase, the pulse spreading can cause constructive interference. For example, the constructive interference can lower "1"s at bits 3, 4, and 5, and raise shoulders between bits 3 and 4, and between bits 4 and 5. Hence the pulses of the simple RZ signal are no longer intact. If the signal with such dispersion is received by a receiver without reconditioned by a dispersion compensator, there would often be significant penalties on the receiving sensitivity. In addition, if the signal with such dispersion has some appreciable power and continues to transmit in the fiber, the signal may suffer from nonlinear distortion that often cannot be recovered with linear dispersion compensation.

In contrast, curve 230 represents a CSRZ signal at 10 Gigabits per second (Gbps). Curve 240 represents the CSRZ signal after 45-kilometer transmission in the single mode fiber. As shown by the curve 240, because adjacent pulses in the CSRZ signal are out of phase by 180 degrees, the pulse spreading is reduced by destructive interference. Hence all pulses of the CSRZ signal remain largely intact. Accordingly, the CSRZ signal often suffers from a dispersion penalty that is smaller than one suffered by the simple RZ signal. Additionally, the nonlinear distortion can also be reduced.

But in the CSRZ signal, two pulses separated by another pulse still have the same phase, which can cause constructive interference. For example, the constructive interference occurs between two "1"s separated by a single "0". As shown by curve 240, the constructive interference between bits 11 and 13 raises the "0" level at bit 12. This interference often limits the dispersion tolerance of the CSRZ signal.

To address these issues, the operation principle of a conventional MZ modulator is analyzed as follows. For a conventional MZ modulator, an incoming optical field is separated into two portions with equal strength. After each portion passes through a path with a certain optical length, the two portions are recombined at the output. Due to the interference effect, the output optical field varies with optical length difference between the two paths. There are electrodes coated along the two paths, and the optical path difference can be varied with the electrical voltages applied on the electrodes through electro-optical (EO) effect. By modulating the applied voltages, the output optical field, and hence the optical intensity is modulated. Mathematically, the output optical field is related to the input by:

$$E_{OUT} = E_{IN}/2 \cdot \{\exp[-i \cdot \eta_1 \cdot D1(t) - i \cdot \phi] - \exp[-i \cdot \eta_2 \cdot D2(t) + i \cdot \phi]\} \quad \text{(Equation 1)}$$

where $E_{IN}$ and $E_{OUT}$ represent input optical field and output optical field respectively. For example, the input optical field is the input electric field, and the output optical field is the output electric field. Additionally, D1(t) and D2(t) represent the electrical signals applied on the electrodes respectively, and $\eta_1$ and $\eta_2$ each are determined by at least EO coefficient and length of the corresponding electrode. Moreover, $\phi$ is related to the inherent path difference and DC bias voltages applied on the electrodes. For each electrode, the total applied voltage equals the sum of the corresponding DC bias voltage and the voltage related to the corresponding electrical signal.

Figure 3:
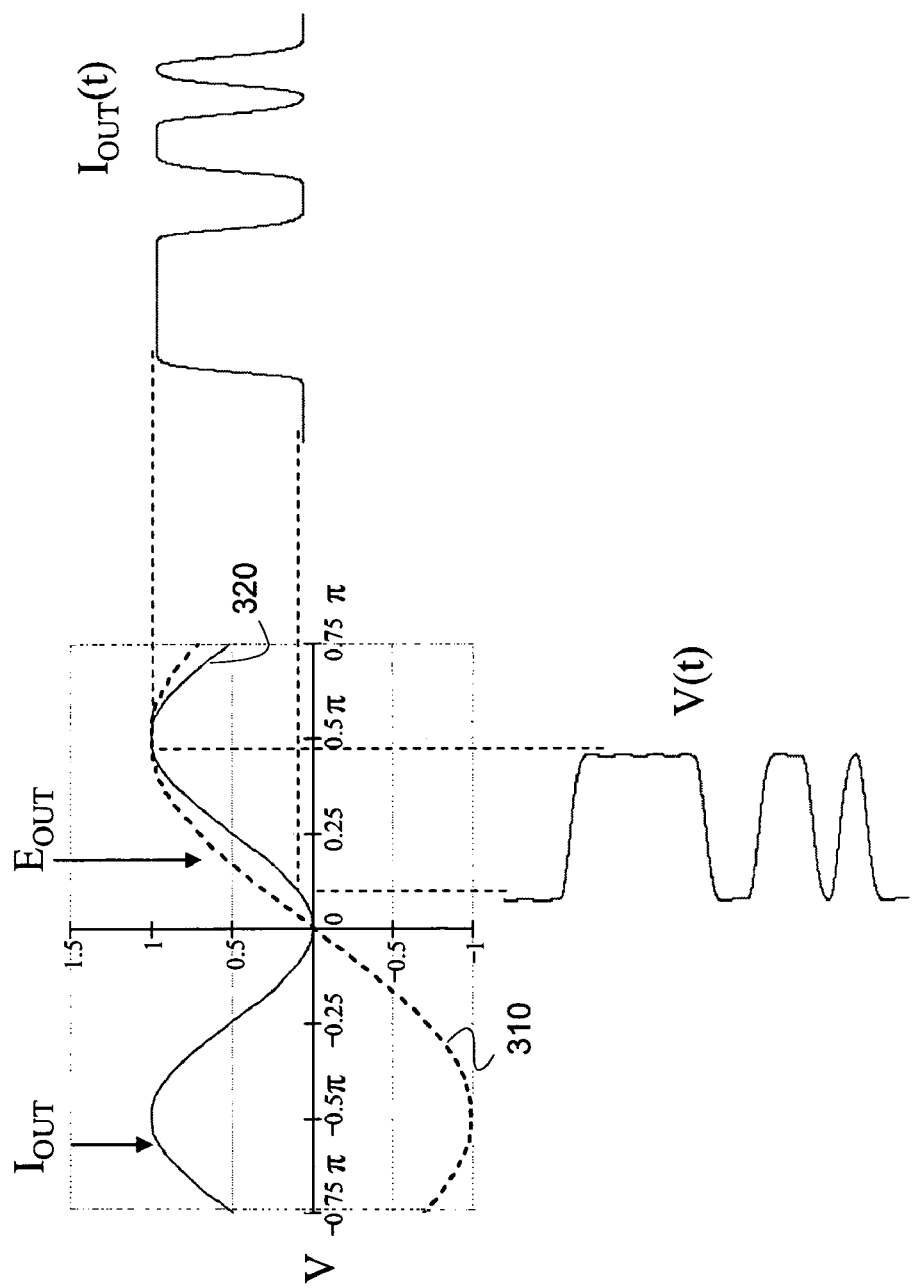
FIG. 3 is a simplified conventional diagram showing relation between input electrical signal and output optical field and intensity for conventional single drive, "push-pull" MZ modulator, and between input electrical signal and output optical intensity in conventional NRZ modulation.

In a conventional single drive, "push-pull" MZ modulator, the electrodes often are configured so that $\eta_1 = -\eta_2 = \eta$. Additionally, the electrical signals are equally applied so that D1(t)=D2(t)=D(t). With proper DC bias voltages, Equation 1 can be simplified as follows:

$$E_{OUT} = E_{IN} \cdot \sin[V(t) + \phi] \quad \text{(Equation 2)}$$

where $V(t) = \eta \cdot D(t)$. Thus the output optical intensity is $$I_{OUT} = I_{IN} \cdot \sin^2[V(t) + \phi] \quad \text{(Equation 3)}$$

where $I_{IN}$ and $I_{OUT}$ represent input optical intensity and output optical intensity respectively. FIG. 3 is a simplified conventional diagram showing relation between input electrical signal and output optical field and intensity for conventional single drive, "push-pull" MZ modulator, and between input electrical signal and output optical intensity in conventional NRZ modulation. Curves 310 and 320 show the output optical field and the output optical intensity as a function of electrical signals respectively. For example, in a conventional NRZ modulation, the MZ modulator is biased by proper DC voltages such that $\phi = \pi/4$. With $\phi = \pi/4$, the electrical signals are configured to swing around a quadrature point at $\pi/4$, at which the output optical intensity is at a half of the maximum. The output optical field keeps the same sign, and the MZ modulator is used for simple intensity modulations.

Figure 4:
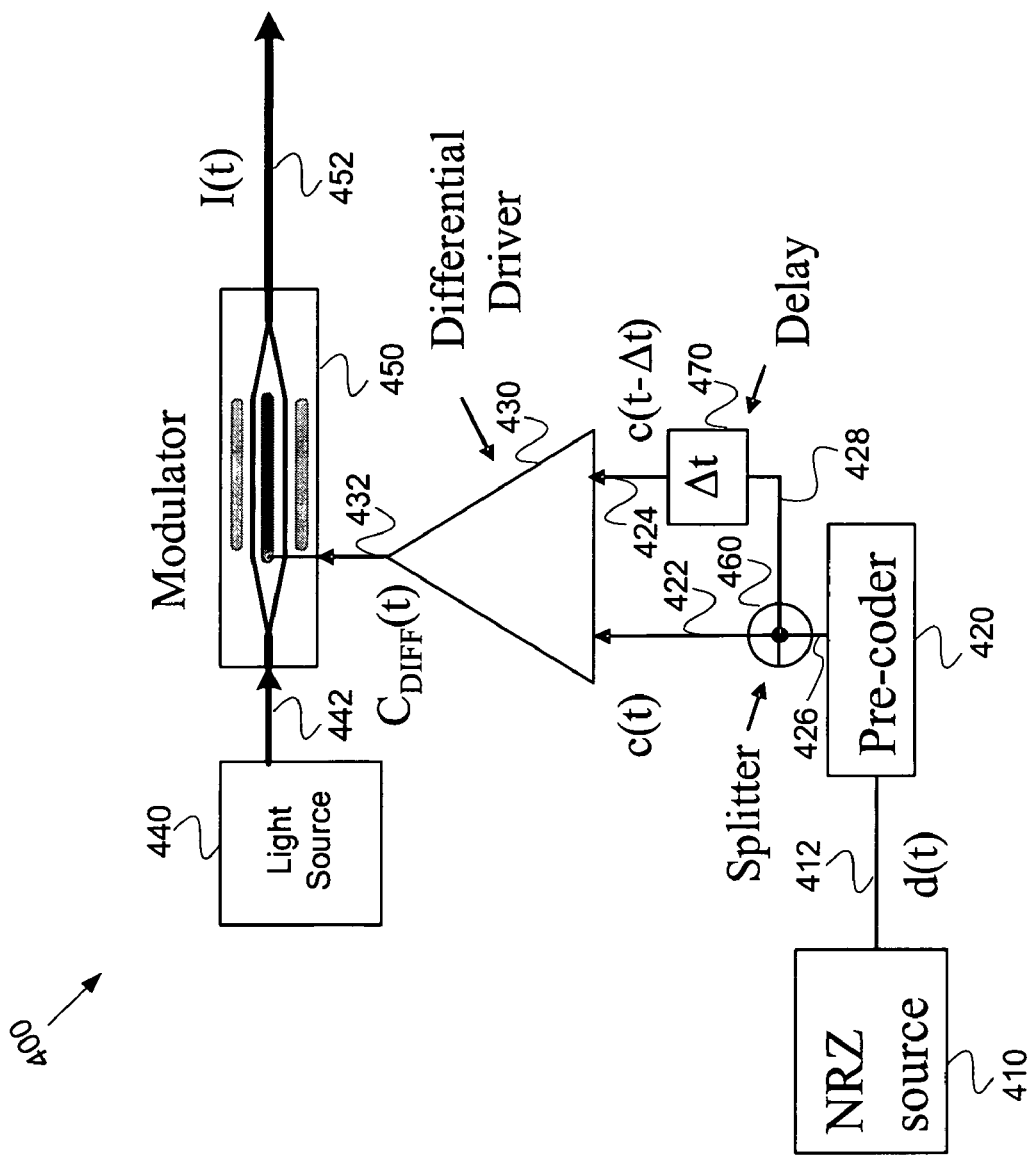
FIG. 4 is a simplified system for generating optical return-to-zero signals with differential bi-phase shift according to an embodiment of the present invention.

FIG. 4 is a simplified system for generating optical return-to-zero signals with differential bi-phase shift according to an embodiment of the present invention. This diagram is merely an example, which should not unduly limit the scope of the claims. One of ordinary skill in the art would recognize many variations, alternatives, and modifications. The system 400 includes an NRZ source 410, a pre-coder 420, a differential driver 430, a light source 440, a modulator 450, a splitter 460, and a time delay device 470. Although the above has been shown using a selected group of apparatuses for the system 400, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 410 provides an electrical NRZ signal 412 to the pre-coder 420. For example, the NRZ signal 412 switches between a logic high level and a logic low level as a function of time. The logic high level can be represented by "1", and the logic low level can be represented by "0". In another example, the NRZ signal 412 represents data in a digital format based on the data information received from another device. In yet another example, the NRZ signal 412 is represented by d(t).

As shown in FIG. 4, the NRZ signal 412 is received by the pre-coder 420. For example, the pre-coder 420 is a coding device. The pre-coder 420 processes the NRZ signal 412 and generates a coded signal 426. For example, the coded signal 426 is represented by c(t). In one embodiment, the NRZ signal 412 includes at least N bits, which are represented by $d_0, d_1, \ldots, d_n, \ldots,$ and $d_{N-1}$. N is an integer larger than 1, and n is an integer equal to or larger than 0, and smaller than N. Correspondingly, the coded signal 426 also includes at least N bits, which are represented by $c_0, c_1, \ldots, c_n, \ldots,$ and $c_{N-1}$. For example, the coded signal 426 and the NRZ signal 412 have the following relationship:

$$c_m = c_{m-p} \oplus d_m \quad \text{(Equation 4)}$$

where m and m-p each are an integer equal to or larger than 0, and smaller than N. ⊕ represents modulo-2 addition. For example, the modulo-2 addition is an XOR operation. In one embodiment, the XOR operation is performed by one or more XOR gates. p is a positive number. For example, p is equal to 1. In one embodiment, $c_{m-p}$ precedes $c_m$ by a predetermined period of time. In another embodiment, the predetermined period of time equals p bit periods.

As shown in FIG. 4, the coded signal 426 is received by the splitter 460, which generates signals 422 and 428. In one embodiment, the signals 422 and 428 represent the same logic sequence without any time delay with respect to each other. In another embodiment, the electrical current for the signal 426 equals sum of the electrical currents for the signals 422 and 428. The electrical voltage for the signal 422 equals the electrical voltage for the signal 428.

The signal 428 is received by the time delay device 470. In response, the time delay device 470 generates a signal 424. The signal 424 is delayed by q bits in comparison with the signal 428. For example, q is a positive number. In one embodiment, q ranges from 0.4 to 1.2. In another embodiment, q ranges from 0.6 to 1. For example, q smaller than 0.6 can lead to shorter pulses and lower transmission efficiency, and q larger than 1 can lead to pulse distortion.

The differential driver 430 receives the signals 422 and 424. The difference between the signals 422 and 424 is determined and amplified. The differential driver outputs the amplified difference as a driving signal 432. For example, the driving signal 432 is an electrical signal. In another example, the driving signal 432 is represented by $C_{DIFF}(t)$. In yet another example, c(t) and c(t−Δt) as the signals 422 and 424 are fed into the differential inputs of the differential driver 430. Δt represents the time period corresponding to q bits. The gain of the differential driver 430 is denoted as G. Accordingly, the driving signal 432 is as follows:

$$C_{DIFF}(t)=G\cdot[c(t)-c(t-\Delta t)] \quad \text{(Equation 5)}$$

The driving signal 432 is received by the modulator 450, which also receives a light 442 from the light source 440. For example, the light source 440 includes a CW diode laser. The light 442 is modulated by the driving signal 432 to generate an output optical signal 452. For example, the modulator 450 is a MZ modulator. In one embodiment, the MZ modulator operates according to Equations 2 and 3 with proper DC bias voltages such that φ=0. For example, with φ=0, the MZ modulator is referred to as being biased at null. Hence, the optical field and intensity of the output signal 452 are:

$$E_{OUT}=E_{IN}\sin\{\eta\cdot G\cdot[c(t)-c(t-\Delta t)]\} \quad \text{(Equation 6)}$$

$$I_{OUT}=I_{IN}\sin^2\{\eta\cdot G\cdot[c(t)-c(t-\Delta t)]\} \quad \text{(Equation 7)}$$

As shown in Equations 6 and 7, the output signal 452 is an optical return-to-zero signal. For example, the optical return-to-zero signal is an optical differential RZ signal, such as an optical RZ signal with differential bi-phase shift. In one embodiment, the optical field of the optical differential RZ signal varies with time. For example, the optical field is the electric field. In another embodiment, for the optical field, every positive optical pulse is proceeded and followed by negative optical pulses, and every negative optical pulse is proceeded and followed by positive optical pluses. In yet another embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1". Additionally, the signals 412, 422, 424, 426, 428, and 432 each are an electrical signal according to another embodiment of the present invention.

Figure 5:
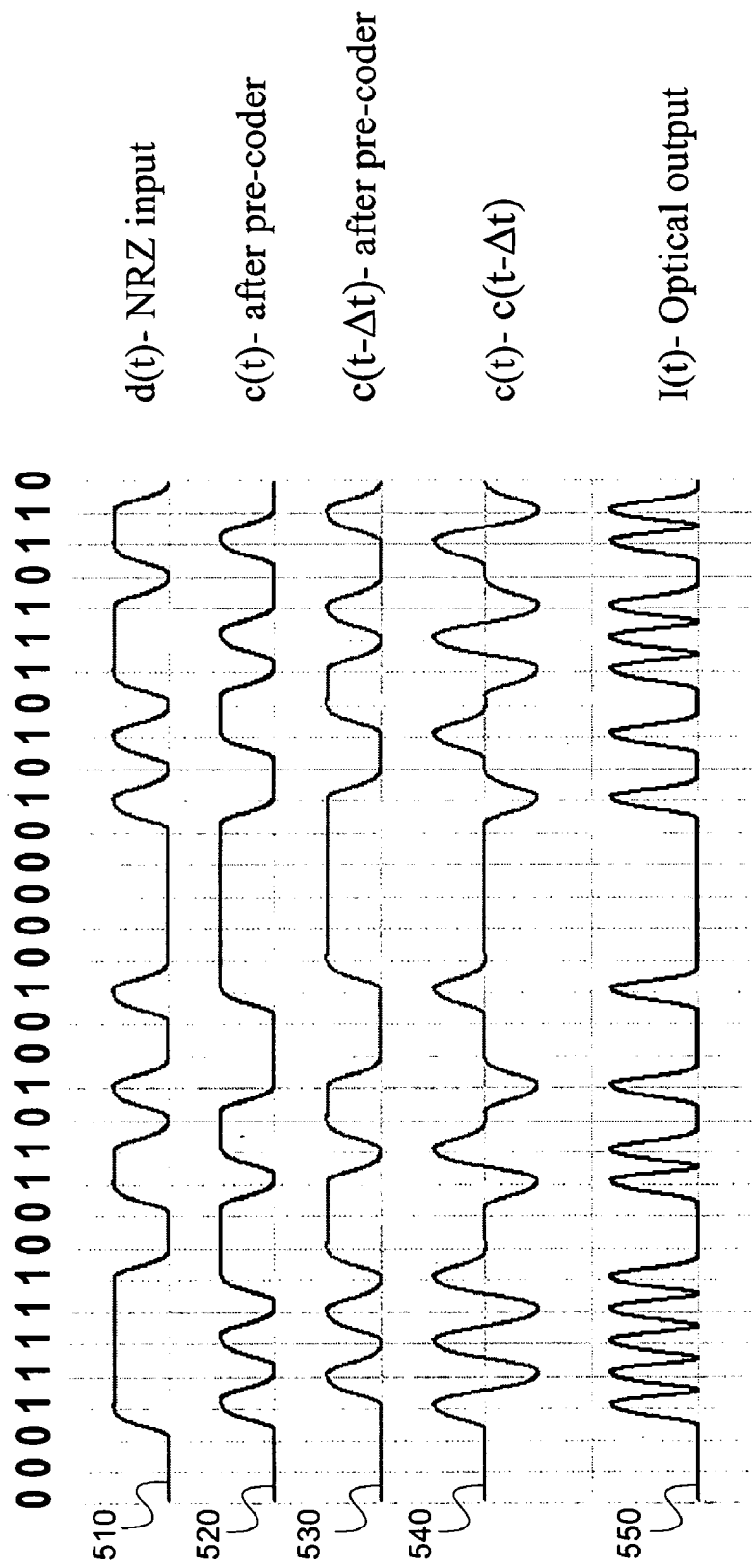
FIGS. 5 and 6 show simplified signal diagrams according to an embodiment of the present invention.
Figure 6:
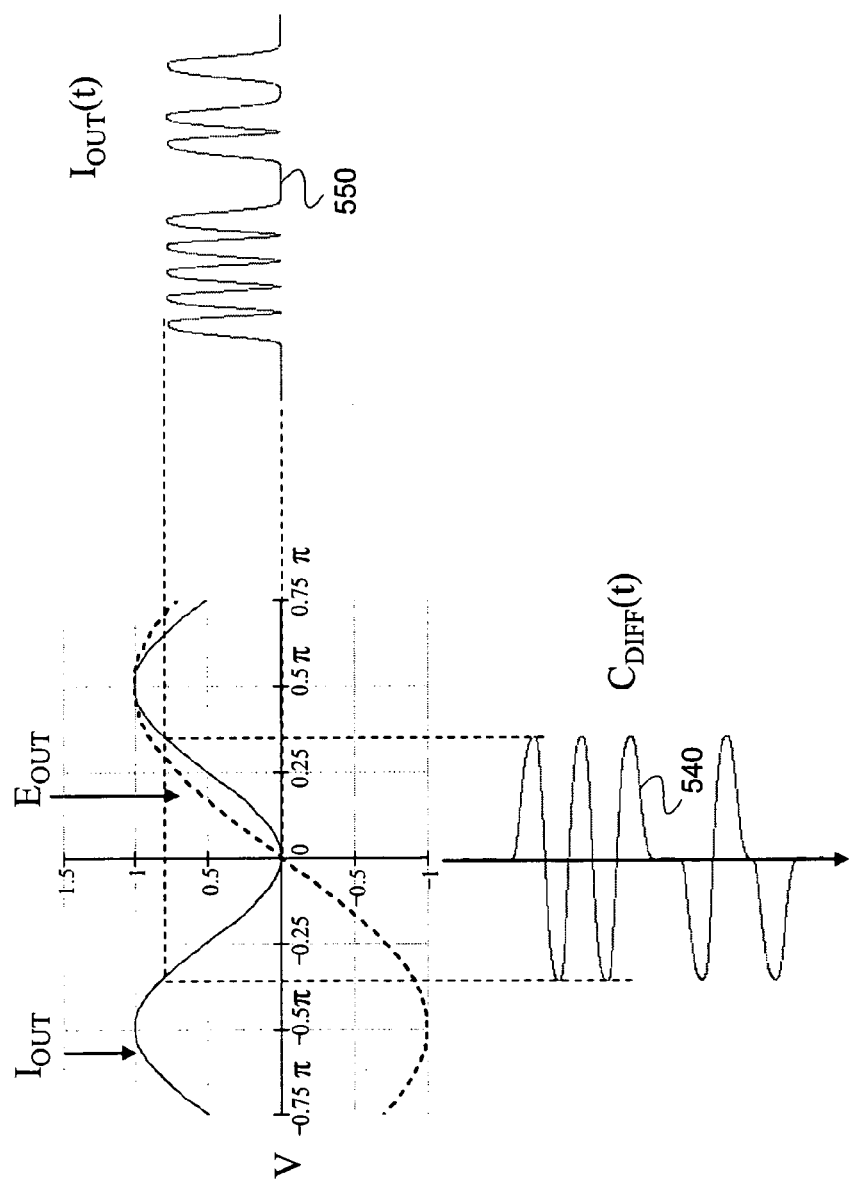

FIGS. 5 and 6 show simplified signal diagrams according to an embodiment of the present invention. These diagrams are merely examples, which should not unduly limit the scope of the claims. One of ordinary skill in the art would recognize many variations, alternatives, and modifications. For example, curves 510, 520, 530, 540, and 550 represent signals 412, 422, 424, 432, and 452 respectively. In one embodiment, the signals 412, 422, 424, and 432 are electrical signals, and the signal 452 is an optical signal. In another embodiment, the curves 510, 520, 530, and 540 each represent signal voltage as a function of time, and the curve 550 represents signal intensity as a function of time.

As shown by curves 510, 520, and 530, the NRZ signal 412 is coded to generate the signals 422 and 428. The signal 428 is delayed to generate the signal 424. For example, the delay corresponds to 0.8 bit period. The difference between the signals 422 and 424 is determined by the differential driver 430, as shown by the curve 540. In one embodiment, the curve 540 has a positive pulse if the curve 520 has a rising edge, and a negative pulse if the curve 520 has a falling edge. In another embodiment, the curve 540 is similar to a curve representing an output from an RC differential circuit. As shown in FIG. 4, the differential driver 430 amplifies the difference and outputs the driving signal 432 to the modulator 450. In response, the modulator 450 generates the output optical signal 452, whose intensity is shown as the curve 550. The output signal 452 is in the RZ format.

As shown in FIGS. 5 and 6, the difference between the signals 422 and 424 is determined and amplified to generate the driving signal 432. The driving signal 432 provides V(t) that swings between −π/2 and π/2. Consequently, the optical field of the output signal 452 can vary with time. For example, the variation includes positive optical pulses in response to positive driving pulses of the driving signal 432, and negative optical pulses in response to negative driving pulses of the driving signal 432.

In one embodiment, for the optical field, every positive optical pulse is proceeded and followed by negative optical pulses, and every negative optical pulse is proceeded and followed by positive optical pluses. In anther embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1".

As shown by curves 510 and 550, the NRZ signal 412 and the output signal 452 represent the same logic sequence according to an embodiment of the present invention. For example, the purpose of the pre-coder 420 is to change the NRZ signal 412 to a modified binary signal so that the intensity of the output signal 452 represents the same logic sequence as the NRZ signal 412.

Figure 7:
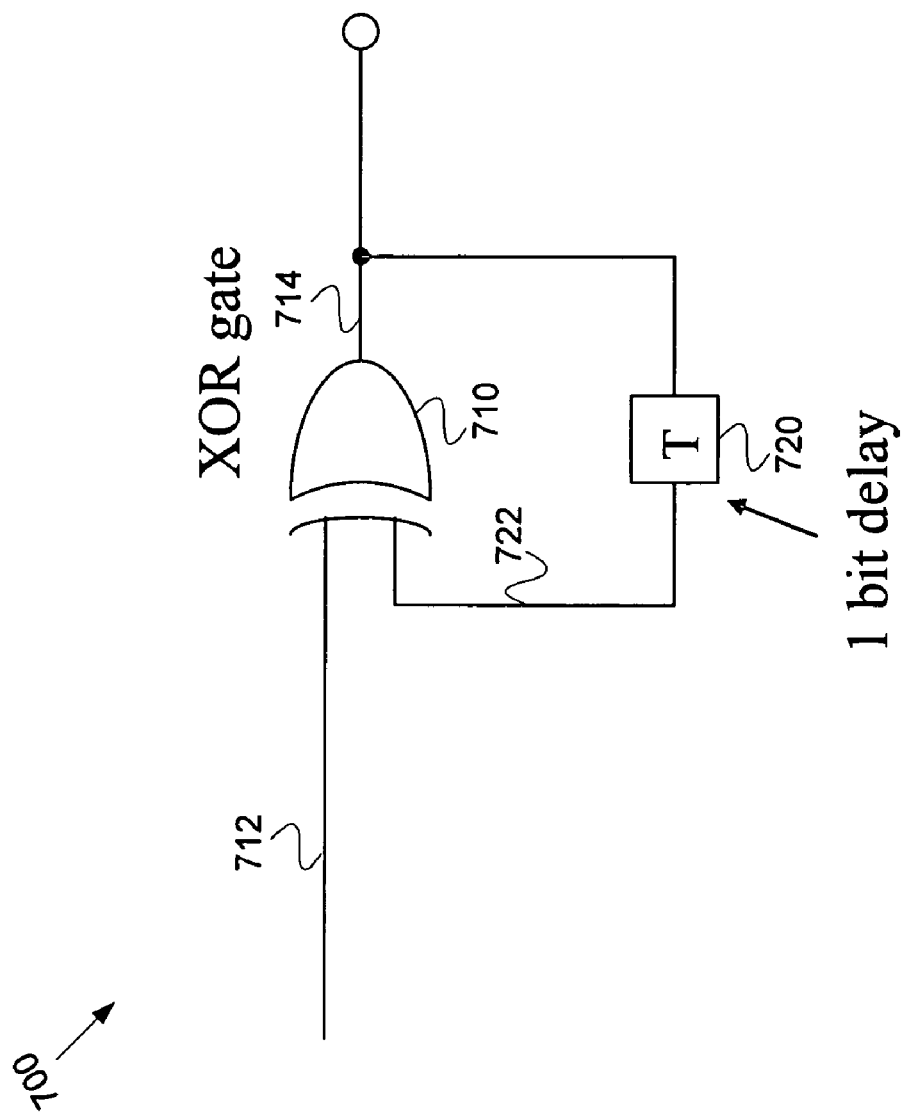
FIG. 7 is a simplified pre-coder used in system for generating optical return-to-zero signals with differential bi-phase shift according to an embodiment of the present invention.

FIG. 7 is a simplified pre-coder used in system 400 for generating optical return-to-zero signals with differential bi-phase shift according to an embodiment of the present invention. This diagram is merely an example, which should not unduly limit the scope of the claims. One of ordinary skill in the art would recognize many variations, alternatives, and modifications. The pre-coder 700 includes an XOR gate 710 and a time delay device 720. Although the above has been shown using a selected group of apparatuses for the bit separator 900, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the pre-coder 700 is the pre-coder 420. Further details of these apparatuses are found throughout the present specification and more particularly below.

The XOR gate 710 receives at least an NRZ signal 712 and generates a coded signal 714. For example, the NRZ signal 712 is the NRZ signal 412. In another example, the coded signal 714 is the coded signal 426. As shown in FIG. 7, the coded signal 714 is received by the time delay device 720. In response, the time delay device 720 generates a feedback signal 722. The feedback signal 722 is delayed by p bits in comparison with the coded signal 714. For example, p is a positive number. In another example, p is equal to 1. The feedback signal 722 is received by the XOR gate 710. The XOR gate 710 performs an exclusive-OR operation to the received signals 712 and 722, and generates the coded signal 714. For example, the coded signal 714 is received by the splitter 460.

Figure 8:
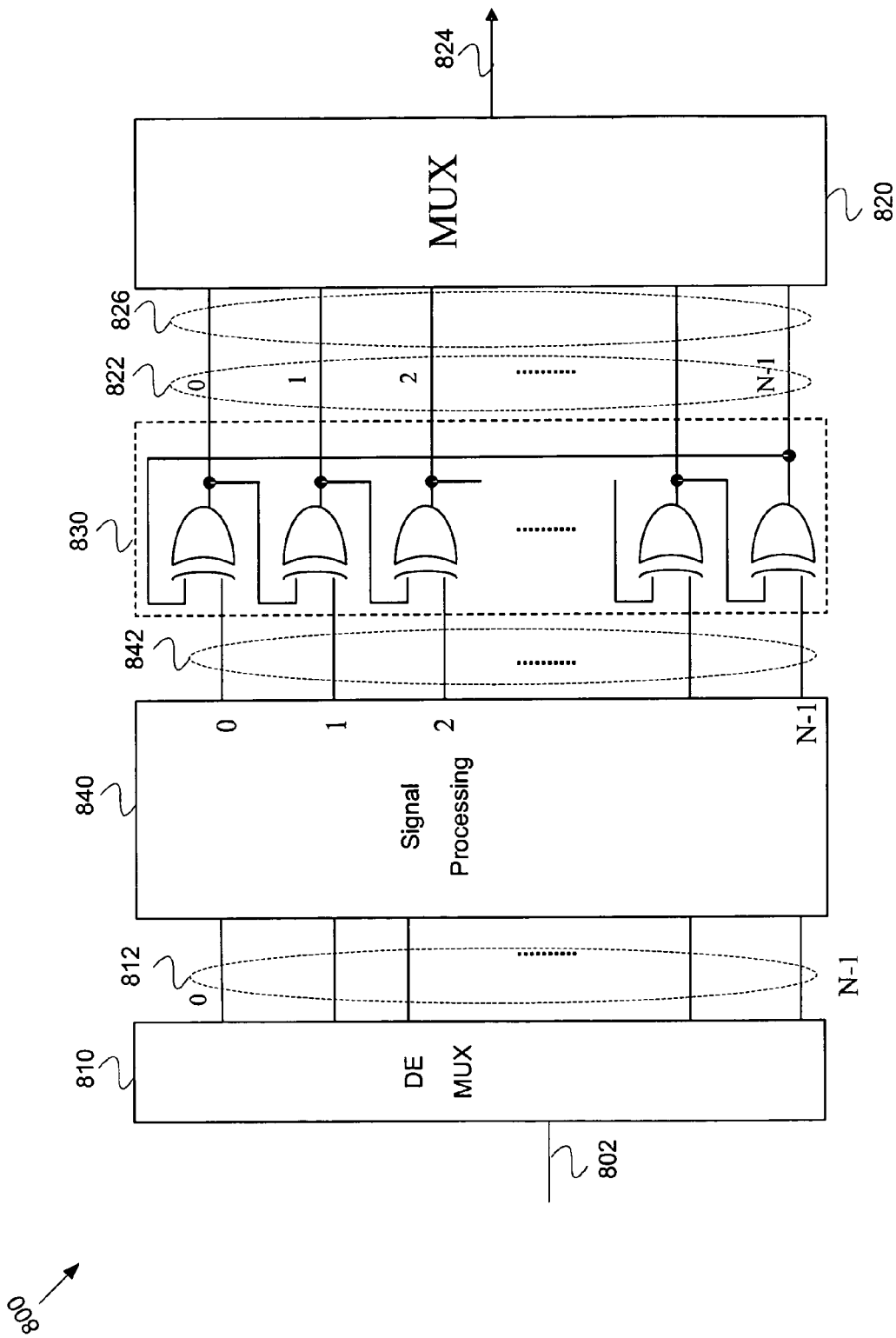
FIG. 8 is a simplified pre-coder used in system 400 for generating optical return-to-zero signals with differential bi-phase shift according to an embodiment of the present invention.

FIG. 8 is a simplified pre-coder used in system 400 for generating optical return-to-zero signals with differential bi-phase shift according to an embodiment of the present invention. This diagram is merely an example, which should not unduly limit the scope of the claims. One of ordinary skill in the art would recognize many variations, alternatives, and modifications. The pre-coder 800 includes a demultiplexer 810, a multiplexer 820, a plurality of XOR gates 830, and a signal processing system 840. Although the above has been shown using a selected group of apparatuses for the pre-coder 800, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the pre-coder 800 is the pre-coder 420. Further details of these apparatuses are found throughout the present specification and more particularly below.

The demultiplexer 810 receives an NRZ signal 802, and demultiplexes the NRZ signal 802 into a plurality of output signals 812. For example, the demultiplexer 810 is a serial-to-parallel demultiplexer. In another example, the NRZ signal 802 is the NRZ signal 412. The plurality of output signals 812 includes N output signals. N is an integer larger than 1. For example, the N output signals include signal 812_0, signal 812_1, ... signal 812_$n$, ..., and signal 812_N−1. n is an integer equal to or larger than 0, and smaller than N. In another example, the NRZ signal 802 corresponds to a clock frequency f, and each of the output signals 812 corresponds to a clock frequency f/N. In yet another example, the NRZ signal 802 includes at least an N-bit sequence, and the N-bit sequence includes bit 0, bit 1, ... bit n, ..., and bit N−1. As shown in FIG. 8, bit 0 is demultiplexed into signal 812_0, bit 1 is demultiplexed into signal 812_1, ..., bit n is demultiplexed into signal 812_$n$, ..., and bit N−1 is demultiplexed into signal 812_N−1.

In one embodiment, the plurality of signals 812 is received by the signal processing system 840. For example, the signal processing system 840 includes a SONET framer. In another example, the signal processing system 840 includes a forward error correction (FEC) encoder. The signal processing system 840 processes the plurality of signals 812 and outputs a plurality of signals 842. The plurality of signals 842 includes N signals. For example, the N signals include signal 842_0, signal 842_1, ... signal 842_$n$, ..., and signal 842_N−1. Signal 842_0 corresponds to signal 812_0, signal 842_1 corresponds to signal 812_1, ..., signal 842_$n$ corresponds to signal 812_$n$, ..., and signal 842_N−1 corresponds to signal 812_N−1.

The plurality of signals 842 is received by the plurality of XOR gates 830. The plurality of XOR gates 830 includes N XOR gates. For example, the N XOR gates include XOR gate 830_0, XOR gate 830_1, ... XOR gate 830_$n$, ..., and XOR gate 830_N−1. As shown in FIG. 8, the XOR gate 830_0 receives at least the signal 842_0, the XOR gate 830_1 receives at least the signal 842_1, ..., the XOR gate 830_$n$ receives at least the signal 842_$n$, ..., and the XOR gate 830_N−1 receives at least the signal 842_N−1.

The plurality of XOR gates 830 generates a plurality of signals 822. The plurality of signals 822 includes N signals. For example, the N signals include signal 822_0, signal 822_1, ... signal 822_$n$, ..., and signal 822_N−1. The signal 822_0 is generated by the XOR gate 830_0, the signal 822_1 is generated by the XOR gate 830_1, ..., the signal 822_$n$ is generated by the XOR gate 830_$n$, ..., and the signal 822_N−1 is generated by the XOR gate 830_N−1. As shown in FIG. 8, the plurality of signals 822 is received by the plurality of XOR gates 830. For example, the signal 822_0 is received by the XOR gate 830_1, the signal 822_1 is received by the XOR gate 830_2, ... the signal 822_$n$ is received by the XOR gate 830_$n$+1 if n is an integer equal to or larger than 0 and smaller than N−1, ..., and the signal 822_N−1 is received by the XOR gate 830_0. Each of the plurality of XOR gates 830 performs an exclusive-OR operation to the received signals, and generates the corresponding one of the plurality of signals 822.

The plurality of signals 822 is received by the multiplexer 820. For example, the multiplexer 820 is a parallel-to-serial multiplexer. The multiplexer 820 includes a plurality of input terminals 826. For example, the plurality of input terminals includes terminal 826_0, terminal 826_1, ..., terminal 826_$n$, ..., and terminal 826_N−1. Terminal 826_0, terminal 826_1, ..., terminal 826_$n$, ..., and terminal 826_N−1 receive signal 822_0, signal 822_1, ... signal 822_$n$, ..., and signal 822_N−1 respectively. In response, the multiplexer 820 generates a coded signal 824. For example, the coded signal 824 is the coded signal 426 received by the splitter 460. In another example, if the signal processing system 840 and the plurality of XOR gates 830 are removed, and the plurality of signals 822 hence is the same as the plurality of signals 812, the multiplexer 820 can output a signal same as the NRZ signal 802.

As discussed above and further emphasized here, FIG. 8 is merely an example, which should not unduly limit the scope of the claims. One of ordinary skill in the art would recognize many variations, alternatives, and modifications. For example, the signal processing system 840 is removed. The plurality of signals 812 is directly received by the plurality of XOR gates 830 respectively.

Figure 9:
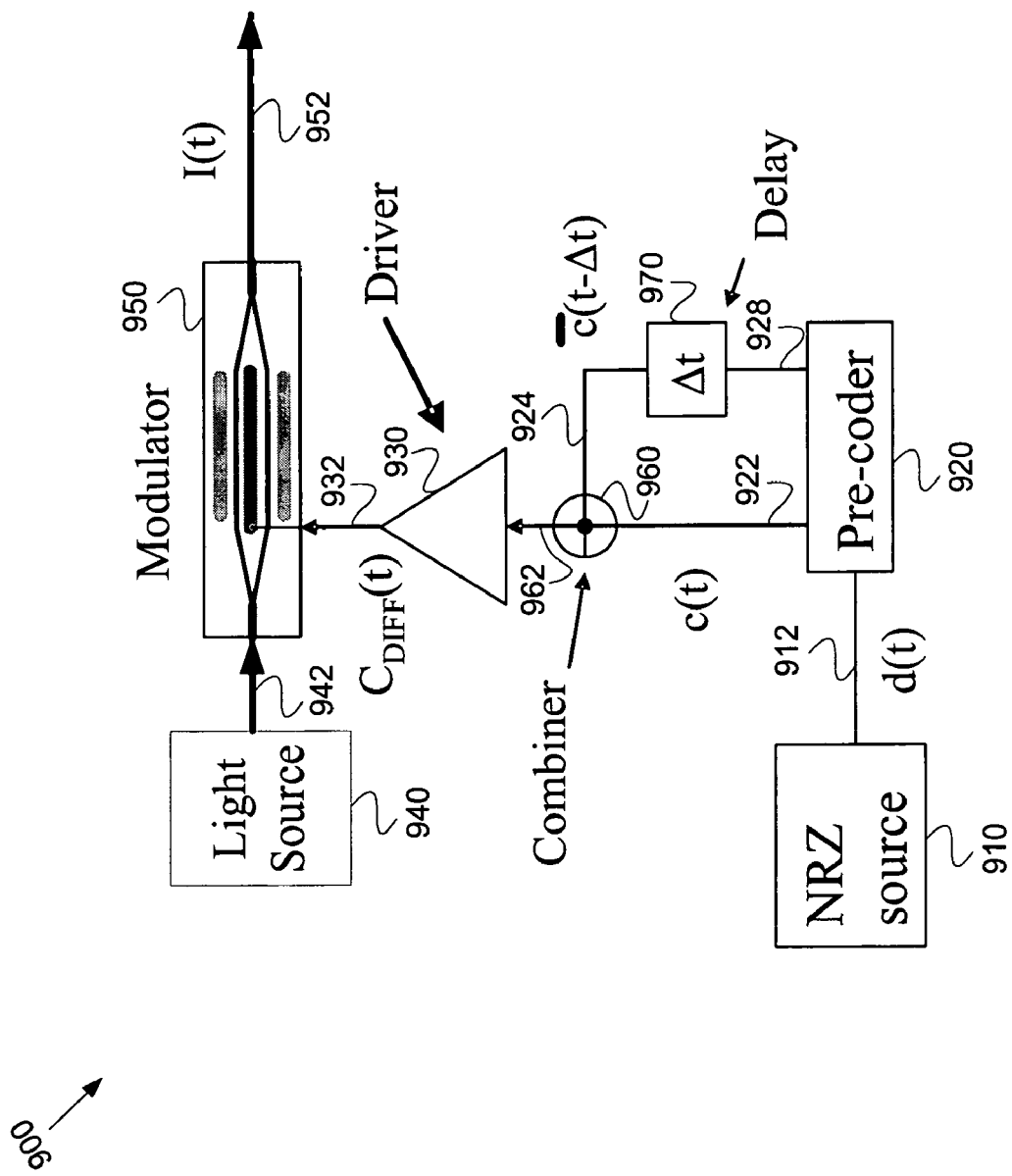
FIG. 9 is a simplified system for generating optical return-to-zero signals with differential bi-phase shift according to another embodiment of the present invention.

FIG. 9 is a simplified system for generating optical return-to-zero signals with differential bi-phase shift according to another embodiment of the present invention. This diagram is merely an example, which should not unduly limit the scope of the claims. One of ordinary skill in the art would recognize many variations, alternatives, and modifications. The system 900 includes an NRZ source 910, a pre-coder 920, a driver 930, a light source 940, a modulator 950, a combiner 960, and a time delay device 970. Although the above has been shown using a selected group of apparatuses for the system 900, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 910 provides an electrical NRZ signal 912 to the pre-coder 920. For example, the NRZ signal 912 switches between a logic high level and a logic low level as a function of time. The logic high level can be represented by "1", and the logic low level can be represented by "0". In another example, the NRZ signal 912 represents data in a digital format based on the data information received from another device. In yet another example, the NRZ signal 912 is represented by d(t).

As shown in FIG. 9, the NRZ signal 912 is received by the pre-coder 920. For example, the pre-coder 920 is a coding device. In another example, the pre-coder 920 is the pre-coder 700 with certain modifications. In yet another example, the pre-coder 920 is the pre-coder 800 with some modifications. The pre-coder 920 processes the NRZ signal 912 and generates coded signals 922 and 928. For example, the coded signal 922 is represented by c(t), and the coded signal 928 is represented by b(t).

In one embodiment, the NRZ signal 912 includes at least N bits, which are represented by $d_0, d_1, \ldots, d_n, \ldots,$ and $d_{N-1}$. N is an integer larger than 1, and n is an integer equal to or larger than 0, and smaller than N. Correspondingly, the coded signal 922 also includes at least N bits, which are represented by $c_0, c_1, \ldots, c_n, \ldots,$ and $c_{N-1}$. Additionally, the coded signal 928 also includes at least N bits, which are represented by $b_0, b_1, \ldots, b_n, \ldots,$ and $b_{N-1}$. For example, the coded signal 922 and the NRZ signal 912 have a relationship according to Equation 4. In another example, the coded signal 928 and the coded signal 922 have the following relationship:

$$b_m = -c_m = \overline{c}_m \quad \text{(Equation 8)}$$

Hence the coded signal 928 can be represented by $\overline{c}(t)$. As shown in FIG. 9, the coded signal 928 is received by the time delay device 970. In response, the time delay device 970 generates a signal 924. The signal 924 is delayed by q bits in comparison with the coded signal 928. For example, q is a positive number. In one embodiment, q ranges from 0.4 to 1.2. In another embodiment, q ranges from 0.6 to 1. For example, q smaller than 0.6 can lead to shorter pulses and lower transmission efficiency, and q larger than 1 can lead to pulse distortion. In another example, the signal 924 can be represented by $\overline{c}(t-\Delta t)$ if the coded signal 928 is represented by $\overline{c}(t)$. $\Delta t$ represents the time period corresponding to q bits.

The combiner 960 receives the signals 922 and 924. The sum of the signals 922 and 924 is determined and outputted as a signal 962 to the driver 930. The driver 930 amplifies the signal 962 and generates a driving signal 932. For example, the driving signal 1132 is represented by $C_{DIFF}(t)$. In another example, c(t) and $\overline{c}(t-\Delta t)$ as the signals 922 and 924 are fed into the combiner 960. The gain of the driver 930 is denoted as G. Accordingly, the driving signal 1132 is determined according to Equation 5.

The driving signal 932 is received by the modulator 950, which also receives a light 942 from the light source 940. For example, the light source 940 includes a CW diode laser. The light 942 is modulated by the driving signal 932 to generate an output optical signal 952. For example, the modulator 950 is a MZ modulator. In one embodiment, the MZ modulator operates according to Equations 2 and 3 with proper DC bias voltages. Hence, the optical field and intensity of the output signal 952 are determined according to Equations 6 and 7 respectively.

As shown in Equations 6 and 7, the output signal 952 is an optical return-to-zero signal. For example, the optical return-to-zero signal is an optical differential RZ signal, such as an optical RZ signal with differential bi-phase shift. In one embodiment, the optical field of the optical differential RZ signal varies with time. For example, the optical field is the electric field. In another embodiment, for the optical field, every positive optical pulse is proceeded and followed by negative optical pulses, and every negative optical pulse is proceeded and followed by positive optical pluses. In yet another embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1". Additionally, the signals 912, 922, 924, 928, 932, and 962 each are an electrical signal according to another embodiment of the present invention.

As discussed above and further emphasized here, FIG. 9 is merely an example, which should not unduly limit the scope of the claims. One of ordinary skill in the art would recognize many variations, alternatives, and modifications. For example, the differential driver 930 is replaced by two amplifiers with identical gains. One amplifier is used to amplify the signal 922, and the other amplifier is used to amplify the signal 924. The outputs of the amplifiers are combined by the combiner 960, which outputs the driving signal 932 to the modulator 950. According to one embodiment, performing amplification prior to combination can relax linearity requirements on the amplifiers.

In a conventional dual drive MZ modulator, the electrodes often are configured so that $\eta_1 = \eta_2 = \eta$. Additionally, the MZ modulator can be biased with proper DC voltages such that $\phi = 0$. For example, with $\phi = 0$, the MZ modulator is referred to as being biased at null. Hence Equation 1 can be simplified as follows:

$$E_{OUT} = E_{IN} \cdot \sin\{[V1(t) - V2(t)] \cdot 0.5\} \cdot \exp\{-i \cdot [V1(t) + V2(t)] \cdot 0.5\} \quad \text{(Equation 9)}$$

$$\text{where } V1(t) = \eta \cdot D1(t) \quad \text{(Equation 10A)}$$

$$\text{and } V2(t) = \eta \cdot D2(t) \quad \text{(Equation 10B)}$$

In a "push-pull" configuration, D1(t)=−D2(t)=D(t). Then Equation 9 becomes the same as Equation 2. Additionally, the output optical intensity is described by Equation 3.

Figure 10:
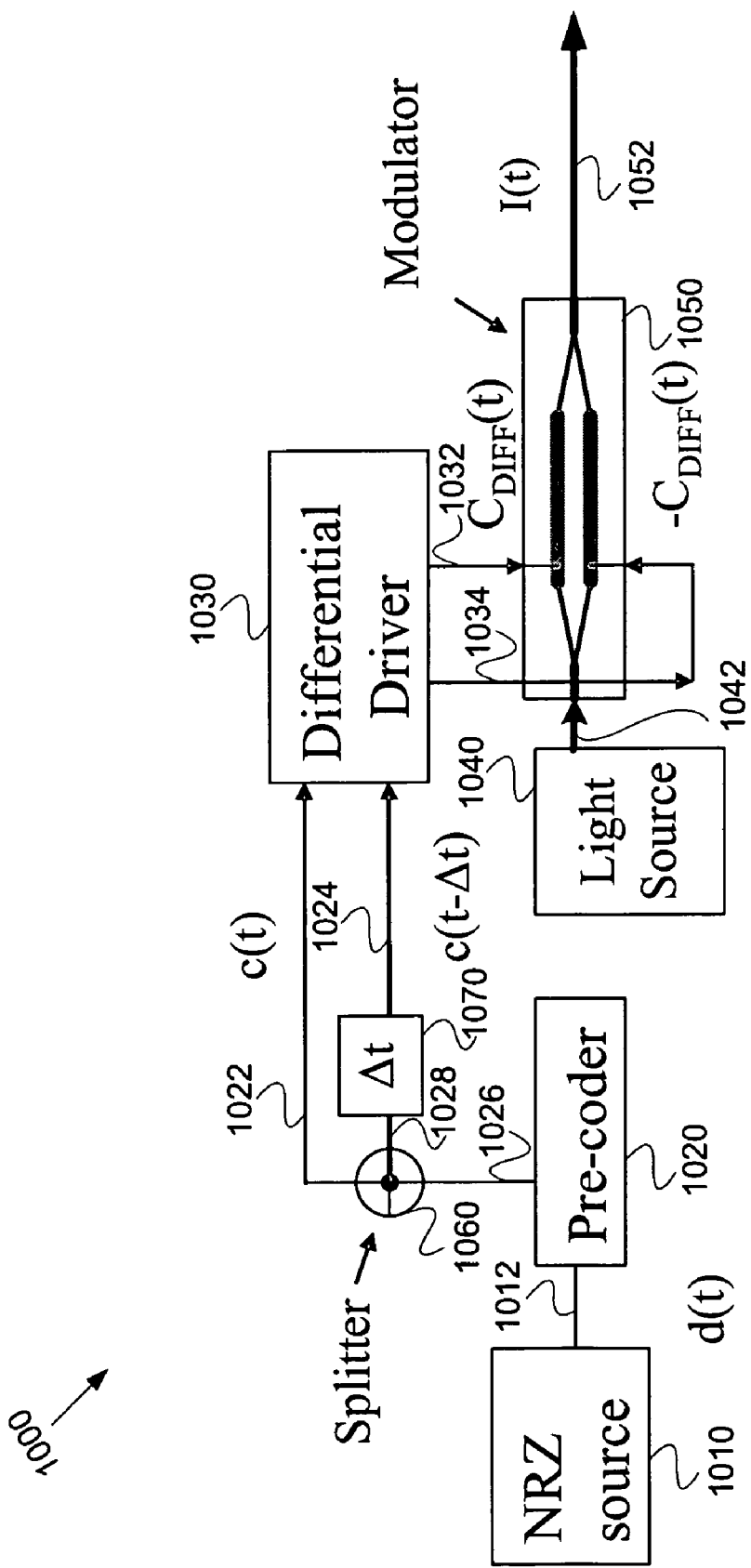
FIG. 10 is a simplified system for generating optical return-to-zero signals with differential bi-phase shift according to yet another embodiment of the present invention.

FIG. 10 is a simplified system for generating optical return-to-zero signals with differential bi-phase shift according to yet another embodiment of the present invention. This diagram is merely an example, which should not unduly limit the scope of the claims. One of ordinary skill in the art would recognize many variations, alternatives, and modifications. The system 1000 includes an NRZ source 1010, a pre-coder 1020, a differential driver 1030, a light source 1040, a modulator 1050, a splitter 1060, and a time delay device 1070. Although the above has been shown using a selected group of apparatuses for the system 1000, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1010 provides an electrical NRZ signal 1012 to the pre-coder 1020. For example, the NRZ signal 1012 switches between a logic high level and a logic low level as a function of time. The logic high level can be represented by "1", and the logic low level can be represented by "0". In another example, the NRZ signal 1012 represents data in a digital format based on the data information received from another device. In yet another example, the NRZ signal 1012 is represented by d(t).

As shown in FIG. 10, the NRZ signal 1012 is received by the pre-coder 1020. For example, the pre-coder 1020 is a coding device. In another example, the pre-coder 1020 is the pre-coder 700. In yet anther example, the pre-coder 1020 is the pre-coder 800. The pre-coder 1020 processes the NRZ signal 1012 and generates a coded signal 1026. For example, the coded signal 1026 is represented by c(t). In one embodiment, the NRZ signal 1012 includes at least N bits, which are represented by $d_0, d_1, \ldots, d_n, \ldots,$ and $d_{N-1}$. N is an integer larger than 1, and n is an integer equal to or larger than 0, and smaller than N. Correspondingly, the coded signal 1026 also includes at least N bits, which are represented by $c_0, c_1, \ldots, c_n, \ldots,$ and $c_{N-1}$. For example, the coded signal 1026 and the NRZ signal 1012 have a relationship according to Equation 4.

As shown in FIG. 10, the coded signal 1026 is received by the splitter 1060, which generates signals 1022 and 1028. In one embodiment, the signals 1022 and 1028 represent the same logic sequence without any time delay with respect to each other. In another embodiment, the electrical current for the signal 1026 equals sum of the electrical currents for the signals 1022 and 1028. The electrical voltage for the signal 1022 equals the electrical voltage for the signal 1028.

The signal 1028 is received by the time delay device 1070. In response, the time delay device 1070 generates a signal 1024. The signal 1024 is delayed by q bits in comparison with the signal 1028. For example, q is a positive number. In one embodiment, q ranges from 0.4 to 1.2. In another embodiment, q ranges from 0.6 to 1. For example, q smaller than 0.6 can lead to shorter pulses and lower transmission efficiency, and q larger than 1 can lead to pulse distortion.

The differential driver 1030 receives the signals 1022 and 1024. The difference between the signals 1022 and 1024 is determined and amplified. The differential driver outputs the amplified difference as driving signals 1032 and 1034. For example, each of the driving signals 1032 and 1034 is an electrical signal. In another example, the driving signal 1032 is represented by $C_{DIFF}(t)$ and $\overline{C}_{DIFF}(t)$ respectively. In yet another example, c(t) and c(t−Δt) as the signals 1022 and 1024 are fed into the differential inputs of the differential driver 1030. Δt represents the time period corresponding to q bits. The gain of the differential driver 1030 is denoted as G. Accordingly, the driving signals 1032 and 1034 are as follows:

$$C_{DIFF}(t) = G \cdot [c(t) - c(t-\Delta t)]$$ (Equation 11A)

$$\overline{C}_{DIFF}(t) = G \cdot [c(t-\Delta t) - c(t)] = -C_{DIFF}(t)$$ (Equation 11B)

The driving signals 1032 and 1034 are received by the modulator 1050, which also receives a light 1042 from the light source 1040. For example, the light source 1040 includes a CW diode laser. The light 1042 is modulated by the driving signal 1032 and 1034 to generate an output optical signal 1052. For example, the modulator 1050 is a MZ modulator. Referring to Equations 9, 10A, and 10B, $D1(t)=C_{DIFF}(t)$ and $D2(t)=-C_{DIFF}(t)$. In one embodiment, the MZ modulator operates according to Equations 2 and 3 with proper DC bias voltages. Hence, the optical field and intensity of the output signal 1052 are determined according to Equations 6 and 7.

As shown in Equations 6 and 7, the output signal 1052 is an optical return-to-zero signal. For example, the optical return-to-zero signal is an optical differential RZ signal, such as an optical RZ signal with differential bi-phase shift. In one embodiment, the optical field of the optical differential RZ signal varies with time. For example, the optical field is the electric field. In another embodiment, for the optical field, every positive optical pulse is proceeded and followed by negative optical pulses, and every negative optical pulse is proceeded and followed by positive optical pluses. In yet another embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1". Additionally, the signals 1012, 1022, 1024, 1026, 1028, 1032, and 1034 each are an electrical signal according to another embodiment of the present invention.

Figure 11:
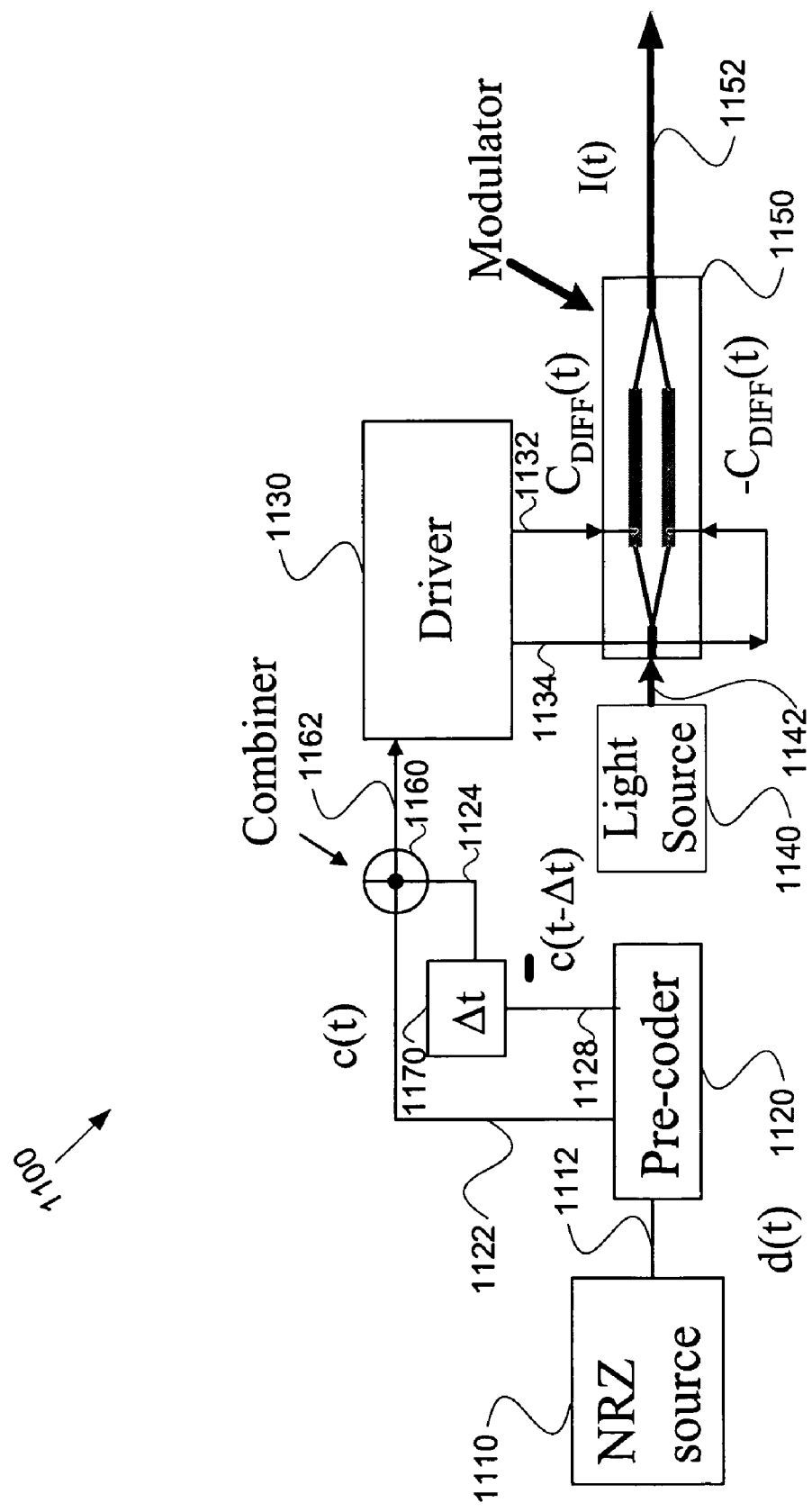
FIG. 11 is a simplified system for generating optical return-to-zero signals with differential bi-phase shift according to yet another embodiment of the present invention.

FIG. 11 is a simplified system for generating optical return-to-zero signals with differential bi-phase shift according to yet another embodiment of the present invention. This diagram is merely an example, which should not unduly limit the scope of the claims. One of ordinary skill in the art would recognize many variations, alternatives, and modifications. The system 1100 includes an NRZ source 1110, a pre-coder 1120, a driver 1130, a light source 1140, a modulator 1150, a combiner 1160, and a time delay device 1170. Although the above has been shown using a selected group of apparatuses for the system 1100, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1110 provides an electrical NRZ signal 1112 to the pre-coder 1120. For example, the NRZ signal 1112 switches between a logic high level and a logic low level as a function of time. The logic high level can be represented by "1", and the logic low level can be represented by "0". In another example, the NRZ signal 1112 represents data in a digital format based on the data information received from another device. In yet another example, the NRZ signal 1112 is represented by d(t).

As shown in FIG. 11, the NRZ signal 1112 is received by the pre-coder 1120. For example, the pre-coder 1120 is a coding device. In another example, the pre-coder 1120 is the pre-coder 700 with certain modifications. In yet anther example, the pre-coder 1120 is the pre-coder 800 with some modifications. The pre-coder 1120 processes the NRZ signal 1112 and generates coded signals 1122 and 1128. For example, the coded signal 1122 is represented by c(t), and the coded signal 1128 is represented by b(t).

In one embodiment, the NRZ signal 1112 includes at least N bits, which are represented by $d_0, d_1, \ldots, d_n, \ldots,$ and $d_{N-1}$. N is an integer larger than 1, and n is an integer equal to or larger than 0, and smaller than N. Correspondingly, the coded signal 1122 also includes at least N bits, which are represented by $c_0, c_1, \ldots, c_n, \ldots,$ and $c_{N-1}$. Additionally, the coded signal 1128 also includes at least N bits, which are represented by $b_0, b_1, \ldots, b_n, \ldots,$ and $b_{N-1}$. For example, the coded signal 1122 and the NRZ signal 1112 have a relationship according to Equation 4. In another example, the coded signal 1128 and the coded signal 1122 have a relationship according to Equation 8.

Hence the coded signal 1128 can be represented by $\bar{c}(t)$. As shown in FIG. 11, the coded signal 1128 is received by the time delay device 1170. In response, the time delay device 1170 generates a signal 1124. The signal 1124 is delayed by q bits in comparison with the coded signal 1128. For example, q is a positive number. In one embodiment, q ranges from 0.4 to 1.2. In another embodiment, q ranges from 0.6 to 1. For example, q smaller than 0.6 can lead to shorter pulses and lower transmission efficiency, and q larger than 1 can lead to pulse distortion. In another example, the signal 1124 can be represented by $\bar{c}(t-\Delta t)$ if the coded signal 1128 is represented by $\bar{c}(t)$. $\Delta t$ represents the time period corresponding to q bits.

The combiner 1160 receives the signals 1122 and 1124. The sum of the signals 1122 and 1124 is determined and outputted as a signal 1162 to the driver 1130. The driver 1130 amplifies the signal 1162 and generates driving signals 1132 and 1134. For example, each of the driving signals 1132 and 1134 is an electrical signal. In another example, the driving signal 1132 is represented by $C_{DIFF}(t)$ and $\bar{C}_{DIFF}(t)$ respectively. In yet another example, the gain of the driver 1130 is denoted as G. Accordingly, the driving signals 1132 and 1134 are described according to Equations 11A and 11B.

The driving signals 1132 and 1134 are received by the modulator 1150, which also receives a light 1142 from the light source 1140. For example, the light source 1140 includes a CW diode laser. The light 1142 is modulated by the driving signal 1132 and 1134 to generate an output optical signal 1152. For example, the modulator 1150 is a MZ modulator. Referring to Equations 9, 10A, and 10B, $D1(t)=C_{DIFF}(t)$ and $D2(t)=-C_{DIFF}(t)$. In one embodiment, the MZ modulator operates according to Equations 2 and 3 with proper DC bias voltages. Hence, the optical field and intensity of the output signal 1152 are determined according to Equations 6 and 7.

As shown in Equations 6 and 7, the output signal 1152 is an optical return-to-zero signal. For example, the optical return-to-zero signal is an optical differential RZ signal, such as an optical RZ signal with differential bi-phase shift. In one embodiment, the optical field of the optical differential RZ signal varies with time. For example, the optical field is the electric field. In another embodiment, for the optical field, every positive optical pulse is proceeded and followed by negative optical pulses, and every negative optical pulse is proceeded and followed by positive optical pluses. In yet another embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1". Additionally, the signals 1112, 1122, 1124, 1128, 1132, 1134, and 1162 each are an electrical signal according to another embodiment of the present invention.

As discussed above and further emphasized here, FIG. 11 is merely an example, which should not unduly limit the scope of the claims. One of ordinary skill in the art would recognize many variations, alternatives, and modifications. For example, the driver 1130 is replaced by two amplifiers. One amplifier receives the signal 1162 and generates the driving signal 1132, and the other amplifier receives the signal 1162 and generates the driving signal 1134.

Figure 12:
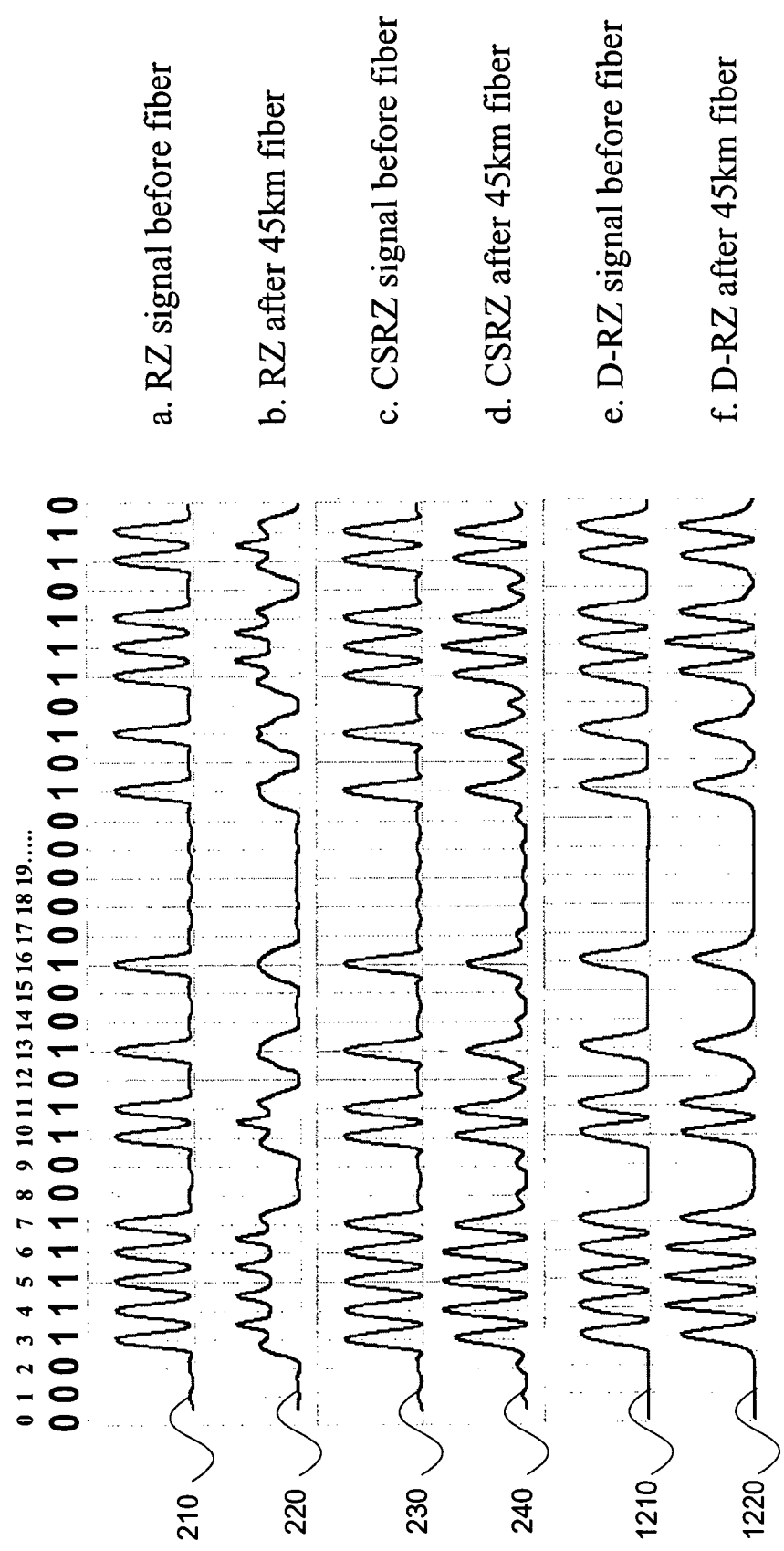
FIG. 12 is a simplified diagram showing comparison between dispersion effects on conventional RZ signals and dispersion effects on RZ signals according to an embodiment of the present invention.

FIG. 12 is a simplified diagram showing comparison between dispersion effects on conventional RZ signals and dispersion effects on RZ signals according to an embodiment of the present invention. This diagram is merely an example, which should not unduly limit the scope of the claims. One of ordinary skill in the art would recognize many variations, alternatives, and modifications. Curve 1210 represents a differential RZ signal. For example, the differential RZ signal is generated by the systems 400, 900, 1000, and/or 1100. Curve 1220 represents the differential RZ signal after 45-kilometer transmission in the single mode fiber. As shown by curve 1220, the signal distortion caused by dispersion for differential RZ signal is much smaller than that for the simple RZ signal and the CSRZ signal as shown by curves 220 and 240 respectively.

Figure 13:
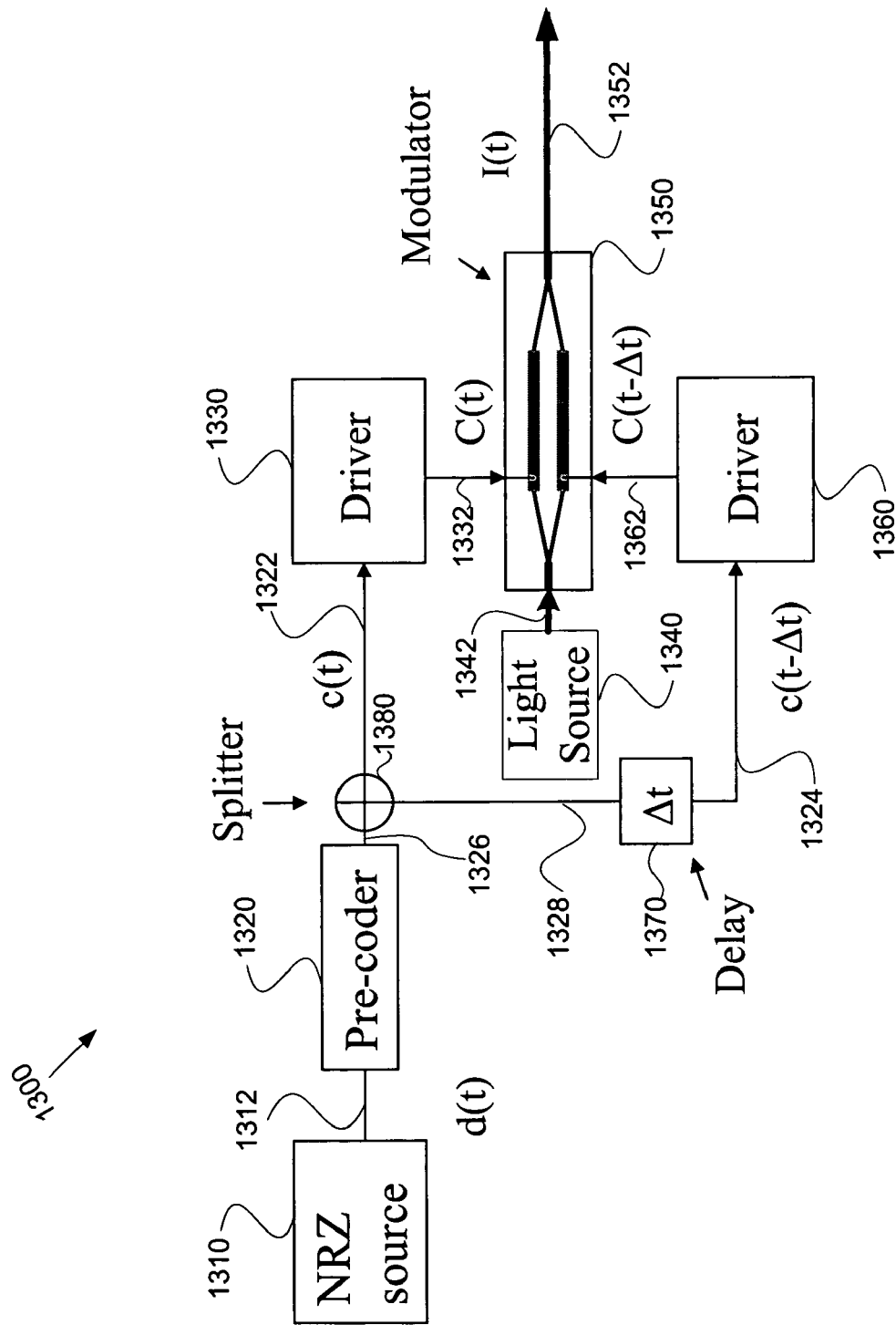
FIG. 13 is a simplified system for generating optical return-to-zero signals with differential bi-phase shift and frequency chirp according to an embodiment of the present invention.

FIG. 13 is a simplified system for generating optical return-to-zero signals with differential bi-phase shift and frequency chirp according to an embodiment of the present invention. This diagram is merely an example, which should not unduly limit the scope of the claims. One of ordinary skill in the art would recognize many variations, alternatives, and modifications. The system 1300 includes an NRZ source 1310, a pre-coder 1320, drivers 1330 and 1360, a light source 1340, a modulator 1350, a time delay device 1370, and a splitter 1380. Although the above has been shown using a selected group of apparatuses for the system 1300, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1310 provides an electrical NRZ signal 1312 to the pre-coder 1320. For example, the NRZ signal 1312 switches between a logic high level and a logic low level as a function of time. The logic high level can be represented by "1", and the logic low level can be represented by "0". In another example, the NRZ signal 1312 represents data in a digital format based on the data information received from another device. In yet another example, the NRZ signal 1312 is represented by d(t).

As shown in FIG. 13, the NRZ signal 1312 is received by the pre-coder 1320. For example, the pre-coder 1320 is a coding device. In another example, the pre-coder 1320 is the pre-coder 700. In yet anther example, the pre-coder 1320 is the pre-coder 800. The pre-coder 1320 processes the NRZ signal 1312 and generates a coded signal 1326. For example, the coded signal 1326 is represented by c(t). In one embodiment, the NRZ signal 1312 includes at least N bits, which are represented by $d_0, d_1, \ldots, d_n, \ldots,$ and $d_{N-1}$. N is an integer larger than 1, and n is an integer equal to or larger than 0, and smaller than N. Correspondingly, the coded signal 1326 also includes at least N bits, which are represented by $c_0, c_1, \ldots, c_n, \ldots,$ and $c_{N-1}$. For example, the coded signal 1326 and the NRZ signal 1312 have a relationship according to Equation 4.

As shown in FIG. 13, the coded signal 1326 is received by the splitter 1380, which generates signals 1322 and 1328. In one embodiment, the signals 1322 and 1328 represent the same logic sequence without any time delay with respect to each other. In another embodiment, the electrical current for the signal 1326 equals sum of the electrical currents for the signals 1322 and 1328. The electrical voltage for the signal 1322 equals the electrical voltage for the signal 1328.

The signal 1328 is received by the time delay device 1370. In response, the time delay device 1370 generates a signal 1324. The signal 1324 is delayed by q bits in comparison with the signal 1328. For example, q is a positive number. In one embodiment, q ranges from 0.4 to 1.2. In another embodiment, q ranges from 0.6 to 1. For example, q smaller than 0.6 can lead to shorter pulses and lower transmission efficiency, and q larger than 1 can lead to pulse distortion.

The driver 1330 receives the signal 1322, and the driver 1360 receives the signal 1324. Additionally, the driver 1330 amplifies the signal 1322 and generates a driving signal 1332. The driver 1360 amplifies the signal 1324 and generates a driving signal 1362. For example, c(t) and c(t−Δt) as the signals 1322 and 1324 are fed into the drivers 1330 and 1360 respectively. Accordingly, the driving signal 1332 is represented by C(t), and the driving signal 1362 is represented by C(t−Δt). In one embodiment, the gains of the drivers 1330 and 1360 each are denoted as 2G. Hence C(t) and C(t−Δt) are determined by:

$$C(t)=2 \cdot G \cdot c(t) \quad \text{(Equation 12A)}$$

$$C(t-\Delta t)=2 \cdot G \cdot c(t-\Delta t) \quad \text{(Equation 12B)}$$

As shown in FIG. 13, the driving signals 1332 and 1362 are received by the modulator 1350, which also receives a light 1342 from the light source 1340. For example, the light source 1340 includes a CW diode laser. The light 1342 is modulated by the driving signal 1332 and 1362 to generate an output optical signal 1352. For example, the modulator 1350 is a MZ modulator. Referring to Equations 9, 10A, 10B, 12A, and 12B, D1(t)=C(t) and D2(t)=C(t−Δt). With proper DC bias voltages, the optical field for the output signal 1352 is $$E_{OUT}=E_{IN}\sin\{\eta \cdot G \cdot [c(t)-c(t-\Delta t)]\} \cdot \exp\{-i\eta G \cdot [c(t)+c(t-\Delta t)]\} \quad \text{(Equation 13)}$$

For example, without the second term $\exp\{-i\eta \cdot G \cdot [c(t)+c(t-\Delta t)]\}$, $E_{OUT}$ represents a differential RZ signal as shown in Equation 6. In another example, the physical meaning of the second term $\exp\{-i\eta G \cdot [c(t)+c(t-\Delta t)]\}$ is to provide a frequency chirp to the optical signal 1352 as shown below:

$$\Delta v_{CHIRP}=-\eta \cdot G \cdot d[c(t)+c(t-\Delta t)]/dt \cdot (1/2 \cdot \pi) \quad \text{(Equation 14)}$$

where $\Delta v_{CHIRP}$ represents the frequency chirp, such as an instantaneous frequency deviation. As shown in Equations 13 and 14, the output signal 1352 is an optical chirped return-to-zero signal. In one embodiment, the chirped return-to-zero signal is a frequency-modulated signal. In another embodiment, the chirped return-to-zero signal has a frequency that varies with time, the variation of frequency staying within a range.

For example, the optical chirped return-to-zero signal is an optical chirped differential RZ signal, such as an optical RZ signal with differential bi-phase shift and frequency chirp. In one embodiment, the optical field of the optical chirped differential RZ signal varies with time. For example, the optical field is the electric field. In another embodiment, for the optical field, every positive optical pulse is proceeded and followed by negative optical pulses, and every negative optical pulse is proceeded and followed by positive optical pluses. In yet another embodiment, every optical pulse that represents a logic high level has a 180-degree phase shift from its nearest optical pulses that also represent the logic high level. For example, the optical pulse that represents the logic high level can be separated from its nearest optical pulses that also represent the logic high level by zero, one, or more bits that do not represent the logic high level. In another example, the logic high level is represented by "1". Additionally, the signals 1312, 1322, 1324, 1326, 1328, 1332, and 1362 each are an electrical signal according to another embodiment of the present invention.

As shown in Equation 14, whether the frequency chirp is positive or negative can vary with time according to an embodiment of the present invention. For example, in the presence of dispersion, time jitters can occur. In another example, the chirped differential return-to-zero signal 1352 often has a smaller dispersion tolerance than the simple differential return-to-zero signal 452, 952, 1052, and/or 1152.

Figure 14:
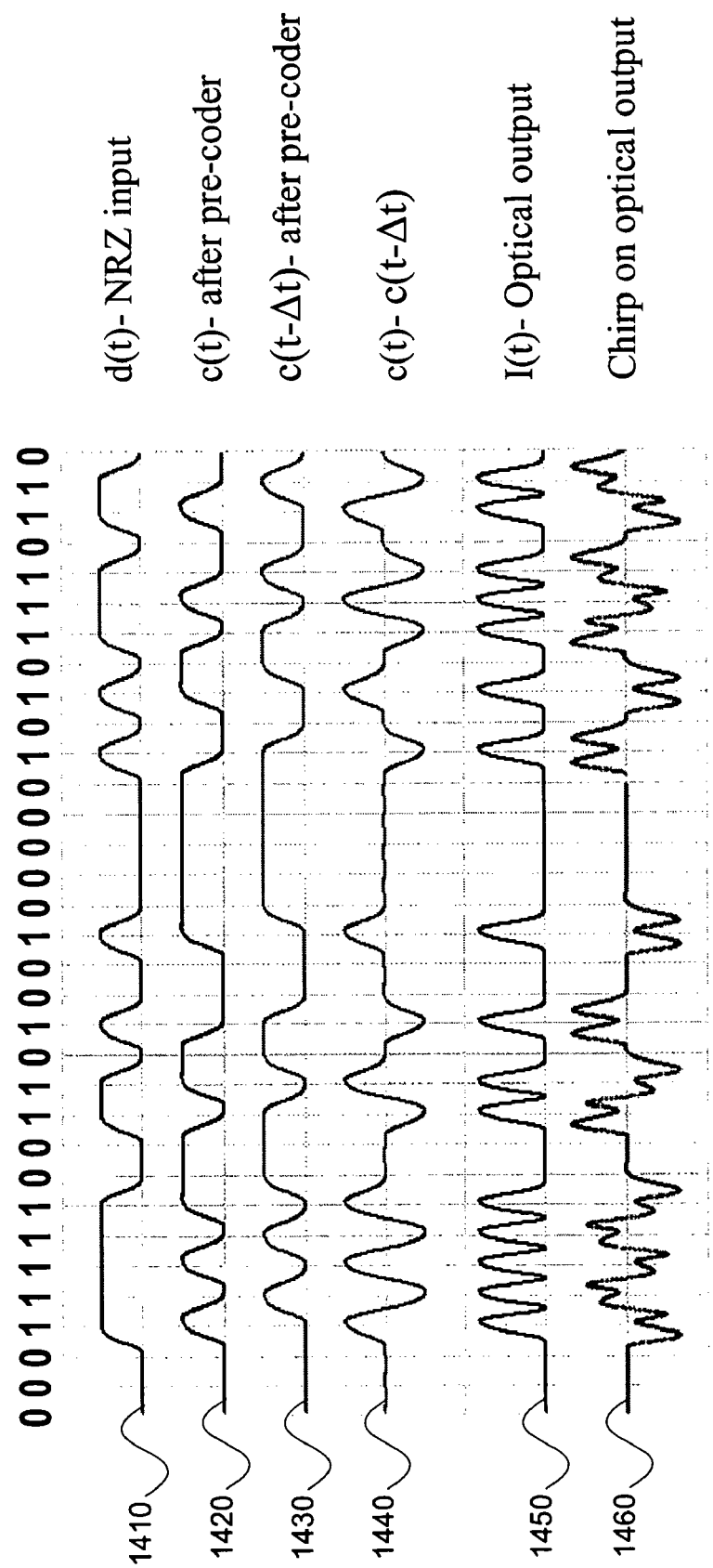
FIG. 14 is a simplified diagram showing intensity spectrum for an output signal generated by system according to an embodiment of the present invention.

FIG. 14 is a simplified diagram showing intensity spectrum for an output signal generated by system 1300 according to an embodiment of the present invention. This diagram is merely an example, which should not unduly limit the scope of the claims. One of ordinary skill in the art would recognize many variations, alternatives, and modifications. For example, curves 1410, 1420, and 1430 represent signals 1312, 1322, and 1324 respectively. As another example, curve 1440 represents difference between signals 1322 and 1324. In one embodiment, the signals 1312, 1322, and 1324 are electrical signals. In another embodiment, the curves 1410, 1420, and 1430 each represent signal voltage as a function of time. As yet another example, curves 1450 and 1460 represent signal intensity as a function of time and chirp as a function of time for signal 1352 respectively. In one embodiment, the signal 1352 is an optical signal.

Figure 15:
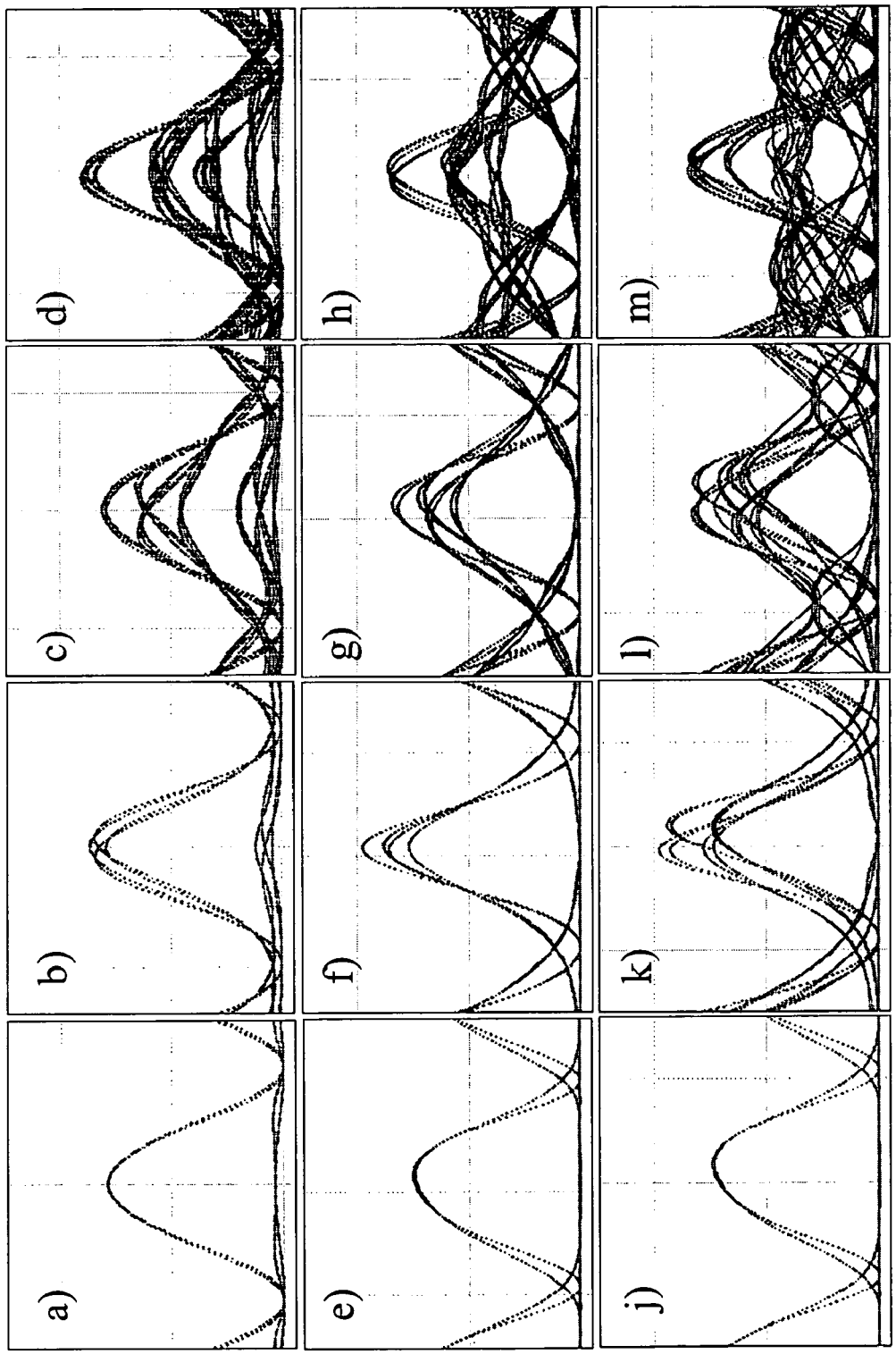
FIG. 15 shows simplified comparison for conventional CSRZ signal, simple differential RZ signal, and chirped differential RZ signal according to an embodiment of the present invention.

FIG. 15 shows simplified comparison for conventional CSRZ signal, simple differential RZ signal, and chirped differential RZ signal according to an embodiment of the present invention. This diagram is merely an example, which should not unduly limit the scope of the claims. One of ordinary skill in the art would recognize many variations, alternatives, and modifications. For example, the conventional CSRZ signal, the simple differential RZ signal, and the chirped differential RZ signal each are at 10 Gbps.

As shown in FIG. 15, diagrams a) through d) are simplified eye diagrams for a conventional CSRZ signal after 0, 30-km, 60-km, and 90-km linear transmission in a single mode fiber. For example, the corresponding total dispersion equals 0, 510, 1020, and 1530 ps/nm respectively. Additionally, diagrams e) through h) are simplified eye diagrams for simple differential RZ signal, such as signal 452, 952, 1052, and/or 1152, after 0, 30-km, 60-km, and 90-km linear transmission in the single mode fiber. Moreover, diagrams j) through m) are simplified eye diagrams for chirped differential RZ signal, such as signal 1352, after 0, 30-km, 60-km, and 90-km linear transmission in the single mode fiber. As an example, for diagrams e) through h) and diagrams j) through m), the delay is set to 0.8 bit period.

For the conventional CSRZ signal, the raised "0" level can completely close the eye after 90-km transmission. Both the simple differential RZ signal and the chirped differential RZ signal can provide good dispersion tolerance. The dispersion tolerance provided by the simple differential RZ signal is even better than one provided by the chirped differential RZ signal.

FIGS. 16(A), (B), and (C) show simplified optical spectra for conventional CSRZ signal, simple differential RZ signal, and chirped differential RZ signal according to certain embodiments of the present invention. These diagrams are merely examples, which should not unduly limit the scope of the claims. One of ordinary skill in the art would recognize many variations, alternatives, and modifications.

FIG. 16(A) is a simplified optical spectrum for a conventional CSRZ signal. Additionally, FIG. 16(B) is a simplified optical spectrum for a simple differential RZ signal, such as signal 452, 952, 1052, and/or 1152. Moreover, FIG. 16(C) is a simplified optical spectrum for a chirped differential RZ signal, such as signal 1352. For both FIGS. 16(B) and (C), the delay is set to 0.8 bit period according to an embodiment.

Figure 16:
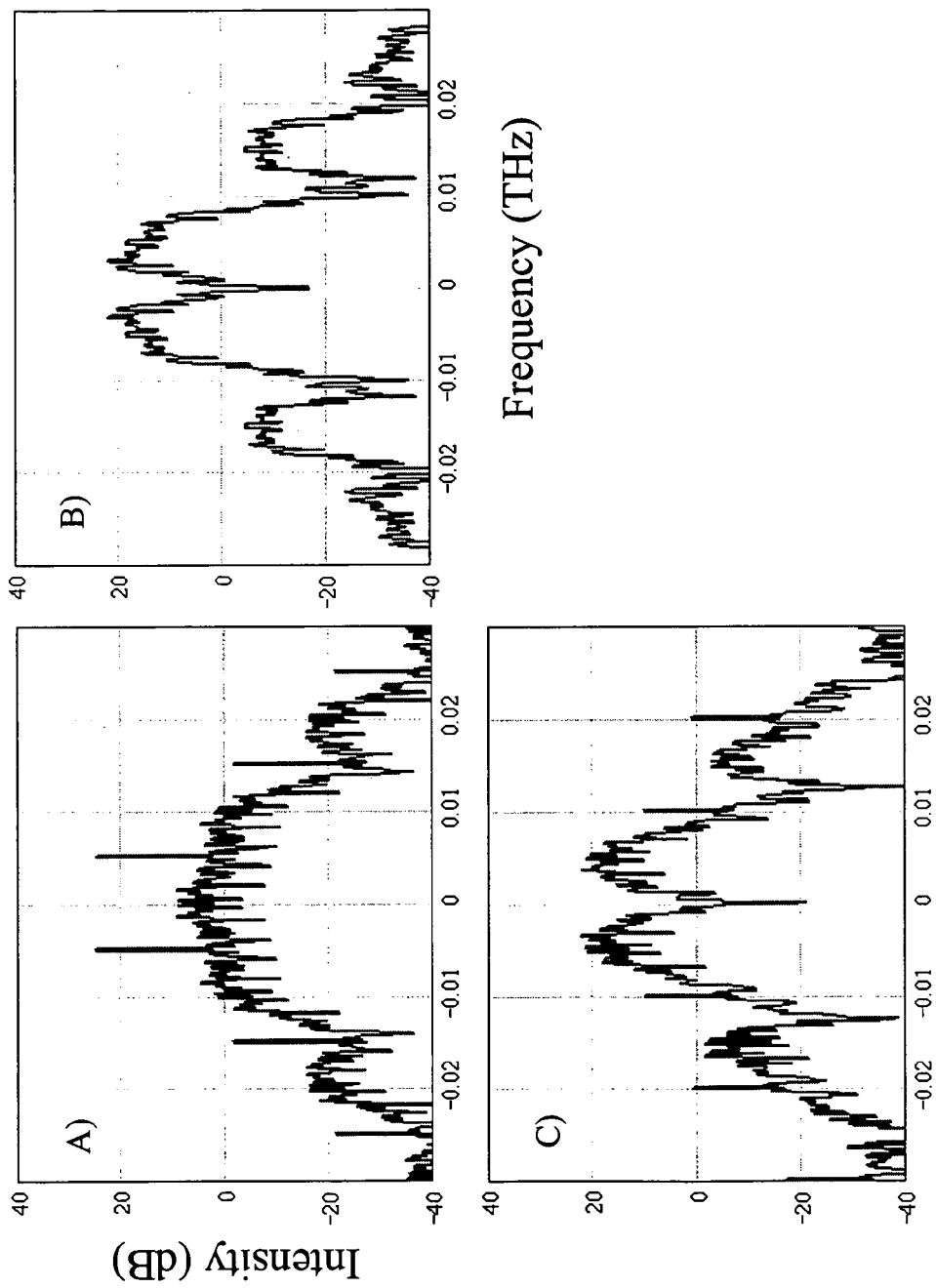
FIGS. 16(A), (B), and (C) show simplified optical spectra for conventional CSRZ signal, simple differential RZ signal, and chirped differential RZ signal according to certain embodiments of the present invention.

As shown in FIG. 16, all three spectra show absence of peak at the carrier frequency, and hence are carrier-suppressed. Compared to the CSRZ spectrum, the spectra of simple differential RZ signal and chirped differential RZ signal have additional suppression of the side peaks. This additional suppression can make simple differential RZ signal and chirped differential RZ signal more resistant to certain distortions caused by some nonlinear effects, such as stimulated Brillouin scattering (SBS) and four-wave-mixing (FWM).

According to another embodiment of the present invention, a system for generating an optical return-to-zero signal includes an electro-optical conversion system. The electro-optical conversion system is configured to receive an input electrical non-return-to-zero signal, process information associated with the input electrical non-return-to-zero signal, and generate a first electrical signal and a second electrical signal based on at least information associated with the input electrical non-return-to-zero signal. Additionally, the electro-optical conversion system is configured to delay a second electrical signal with respect to the first electrical signal by a predetermined period of time, process information associated with the first electrical signal and the delayed second electrical signal, and generate an output optical return-to-zero signal based on at least information associated with the first electrical signal and the delayed second electrical signal. The output optical return-to-zero signal is an optical differential return-to-zero signal, and the output optical return-to-zero signal is substantially free from any frequency chirp. For example, the system is implemented according to the system 400, 900, 1000, and/or 1100.

According to yet another embodiment of the present invention, a system for generating an optical return-to-zero signal includes a coding device configured to receive an input electrical non-return-to-zero signal and generate a coded signal. The coded signal is split into a first signal and a second signal. Additionally, the system includes a time delay device configured to receive the second signal and generate a third signal. The third signal is delayed with respect to the second signal by a predetermined period of time. Moreover, the system includes a driver configured to receive the first signal and the third signal and generate a driving signal. The driving signal is associated with a difference between the first signal and the third signal. Also, the system includes a light source configured to generate a light, and an electro-optical modulator configured to receive the light and the driving signal, modulate the light with the driving signal, and generate an output optical signal. The third signal at a first time is associated with a result of modulo-2 addition of the second signal at the first time and the third signal at a second time. The second time precedes the first time by the predetermined period of time. The output optical signal is an optical return-to-zero signal. For example, the system is implemented according to the system 400.

According to another embodiment of the present invention, a system for generating an optical return-to-zero signal includes a coding device configured to receive an input electrical non-return-to-zero signal and generate a first signal and a second signal, and a time delay device configured to receive the second signal and generate a third signal. The third signal is delayed with respect to the second signal by a predetermined period of time. Additionally, the system includes a combiner configured to receive the first signal and the third signal and generate a fourth signal. The fourth signal is associated with a sum of the first signal and the third signal. Moreover, the system includes a light source configured to generate a light, and an electro-optical modulator configured to receive the light and a driving signal, modulate the light with the driving signal, and generate an output optical signal. The third signal at a first time is associated with a result of modulo-2 addition of the second signal at the first time and the third signal at a second time, the second time preceding the first time by the predetermined period of time. The driving signal is proportional to the fourth signal, and the output optical signal is an optical return-to-zero signal. For example, the system is implemented according to the system 900.

According to yet another embodiment of the present invention, a system for generating an optical return-to-zero signal includes a coding device configured to receive an input electrical non-return-to-zero signal and generate a coded signal. The coded signal is split into a first input signal and a second input signal. Additionally, the system includes a time delay device configured to receive the second input signal and generate a third input signal. The third input signal is delayed with respect to the second input signal by a predetermined period of time. Moreover, the system includes a driver configured to receive the first input signal and the third input signal and generate a first driving signal and a second driving signal. Each of the first driving signal and the second driving signal is associated with a difference between the first input signal and the third input signal. Also, the system includes a light source configured to generate a light, and an electro-optical modulator configured to receive the light, the first driving signal, and the second driving signal, modulate the light with the first driving signal and the second driving signal, and generate an output optical signal. The third input signal at a first time is associated with a result of modulo-2 addition of the second input signal at the first time and the third input signal at a second time, the second time preceding the first time by the predetermined period of time. The output optical signal is an optical return-to-zero signal. For example, the system is implemented according to the system 1000.

According to yet another embodiment of the present invention, a system for generating an optical return-to-zero signal includes a coding device configured to receive an input electrical non-return-to-zero signal and generate a first input signal and a second input signal, and a time delay device configured to receive the second input signal and generate a third input signal. The third input signal is delayed with respect to the second input signal by a predetermined period of time. Additionally, the system includes a combiner configured to receive the first input signal and the third input signal and generate a fourth input signal. The fourth input signal is associated with a sum of the first input signal and the third input signal. Moreover, the system includes a light source configured to generate a light, and an electro-optical modulator configured to receive the light, a first driving signal, and a second driving signal, modulate the light with the first driving signal and the second driving signal, and generate an output optical signal. The third input signal at a first time is associated with a result of modulo-2 addition of the second input signal at the first time and the third input signal at a second time, and the second time precedes the first time by the predetermined period of time. Each of the first driving signal and the second driving signal is proportional to the fourth signal, and the output optical signal is an optical return-to-zero signal. For example, the system is implemented according to the system 1100.

According to yet another embodiment of the present invention, a system for generating an optical return-to-zero signal includes a coding device configured to receive an input electrical non-return-to-zero signal and generate a coded signal. The coded signal is split into a first input signal and a second input signal. Additionally, the system includes a time delay device configured to receive the second input signal and generate a third input signal. The third input signal is delayed with respect to the second input signal by a predetermined period of time. Moreover, the system includes a light source configured to generate a light, and an electro-optical modulator configured to receive the light, a first driving signal, and a second driving signal, modulate the light with the first driving signal and the second driving signal, and generate an output optical signal. The third input signal at a first time is associated with a result of modulo-2 addition of the second input signal at the first time and the third input signal at a second time, the second time preceding the first time by the predetermined period of time. The first driving signal is proportional to the first input signal in signal strength, and the second driving signal is proportional to the second input signal in signal strength. The output optical signal is an optical return-to-zero signal with a frequency chirp. For example, the system is implemented according to the system 1300.

The present invention has various advantages. Some embodiments of the present invention provide systems and methods for generating optical differential return-to-zero signals. Certain embodiments of the present invention provides systems and methods that separate a pre-coded electrical non-return-to-zero (NRZ) signal into two signals, introduce a delay to one of the two signals relative to the other of the two signals, and then combine the two signals differentially to drive a Mach-Zehnder (MZ) electro-optical (EO) modulator to generate an optical RZ signal with differential bi-phase shift. For example, every "1" pulse has a 180-degree phase shift from its nearest "1" pulses.

Certain embodiments of the present invention can reduce interactions between the pulses that represent a logic high level, regardless of their separation in bit periods. Some embodiments of the present invention provide systems and methods that use only one MZ data modulator to generate the differential RZ (DRZ) signals. Certain embodiments of the present invention can significantly lower the cost of a transmitter for optical DRZ signals. Some embodiments of the present invention can significantly reduce the complexity of a transmitter for optical DRZ signals. Certain embodiments of the present invention can provide optical differential RZ signals that improve dispersion tolerance over conventional optical RZ signals. Some embodiments of the present invention can provide optical differential RZ signals that improve dispersion tolerance over conventional optical NRZ signals. This improvement can be against certain conventional wisdom, with which it is believed that the short pulses in an RZ format should always lead to smaller dispersion tolerance.

Certain embodiments of the present invention can significantly improve reliability of a transmitter for optical DRZ signals. Some embodiments of the present invention can significantly improve performance of a fiber optical transport system. For example, the fiber optical transport system is used for transmission at a high data rate, such as a rate higher than 10 Gbps.

Certain embodiments of the present invention can provide systems and methods that pro-code an electrical non-return-to-zero (NRZ) signal, and then combine differentially the output and the delayed output in order to drive a single drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal. For example, the systems and methods are implemented according to FIG. 9. Some embodiments of the present invention can provide systems and methods that pro-code an electrical non-return-to-zero (NRZ) signal, and then combine differentially the output and the delayed output in order to drive a dual drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal. For example, the systems and methods are implemented according to FIG. 11.

Certain embodiments of the present invention can provide systems and methods that pro-code an electrical non-return-to-zero (NRZ) signal, and then combine differentially the output and the delayed output with a differential amplifier. The generated signal is used to drive a single drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal. For example, the systems and methods are implemented according to FIG. 4. Some embodiments of the present invention can provide systems and methods that pro-code an electrical non-return-to-zero (NRZ) signal, and then combine differentially the output and the delayed output with a differential amplifier. The generated signal is used to drive a dual drive Mach-Zehnder modulator in push-pull configuration. The output of the MZ modulator is an optical RZ signal with differential bi-phase shift. The intensity of the optical RZ signal represents a logic sequence that is the same as one represented by the NRZ signal. For example, the systems and methods are implemented according to FIG. 10.

Certain embodiments of the present invention can provide systems and methods that pro-code an electrical non-return-to-zero (NRZ) signal, and then use the output and the delayed output to drive a dual drive Mach-Zehnder modulator in differential configuration. The output of the MZ modulator is an optical RZ signal with differential bi-phase shift and frequency chirp. The intensity of the optical RZ signal represents a logic sequence that is the same as one represented by the NRZ signal. For example, the systems and methods are implemented according to FIG. 13.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for generating an optical return-to-zero signal, the system comprising:

a coding device configured to receive an input electrical non-return-to-zero signal and generate a coded signal, the coded signal being associated with the electrical non-return-to-zero signal by modulo-2 addition, the coded signal being split into a first signal and a second signal;

a time delay device configured to receive the second signal and generate a third signal, the third signal being delayed with respect to the second signal by a predetermined period of time;

a driver configured to receive the first signal and the third signal and generate a driving signal, the driving signal being associated with a difference between the first signal and the third signal;

a continuous wave (CW) laser configured to generate a light;

an electro-optical modulator configured to receive the light and the driving signal, modulate the light with the driving signal, and generate an output optical signal;

wherein:

the driving signal includes a plurality of pulses, each of the plurality of pulses representing a logic high level;

each of the plurality of pluses is associated with a first 180-degree phase shift from a first nearest one of the plurality of pulses, the first nearest one of the plurality of pulses preceding the each of the plurality of pluses;

the each of the plurality of pluses is associated with a second 180-degree phase shift from a second nearest one of the plurality of pulses, the second nearest one of the plurality of pulses following the each the plurality of pulses;

the predetermined period of time corresponds to a number of bit periods, the number of bit periods being a positive number;

the output optical signal is an optical return-to-zero signal;

the output optical return-to-zero signal is substantially free from any frequency chirp.

2. The system of claim 1 wherein the optical return-to-zero signal is an optical differential return-to-zero signal.

3. The system of claim 1 wherein the number of bit periods ranges from 0.4 to 1.2.

4. The system of claim 3 wherein the number of bit periods ranges from 0.6 to 1.

5. The system of claim 1, and further comprising a non-return-to-zero source configured to provide the input electrical non-return-to-zero signal.

6. The system of claim 1 wherein each of the coded signal, the first signal, the second signal, the third signal, and the driving signal is an electrical signal.

7. The system of claim 1 wherein the driving signal is proportional to the difference between the first signal and the third signal.

8. The system of claim 1 wherein the electro-optical modulator is a Mach-Zehnder modulator.

9. A system for generating an optical return-to-zero signal, the system comprising:

a coding device configured to receive an input electrical non-return-to-zero signal and generate a coded signal, the coded signal being associated with the electrical non-return-to-zero signal by modulo-2 addition, the coded signal being split into a first input signal and a second input signal;

a time delay device configured to receive the second input signal and generate a third input signal, the third input signal being delayed with respect to the second input signal by a predetermined period of time;

a driver configured to receive the first input signal and the third input signal and generate a first driving signal mad a second driving signal, each of the first driving signal and the second driving being associated with a difference between the first input signal and the third input signal;

a continuous wave (CW) laser configured to generate a light;

an electro-optical modulator configured to receive the light, the first driving signal, and the second driving signal, modulate the light with the first driving signal and the second driving signal, and generate an output optical signal;

wherein:

each of the first and second driving signals includes a plurality of pulses, each of the plurality of pulses representing a logic high level;

each of the plurality of pluses is associated with a first 180-degree phase shift from a first nearest one of the plurality of pulses, the first nearest one of the plurality of pulses preceding the each of the plurality of pluses;

the each of the plurality of pluses is associated with a second 180-degree phase shift from a second nearest one of the plurality of pulses, the second nearest one of the plurality of pulses following the each the plurality of pluses;

the predetermined period of time corresponds to a number of bit periods, the number of bit periods being a positive number;

the output optical signal is an optical return-to-zero signal;

the output optical return-to-zero signal is substantially free from any frequency chirp.

10. The system of claim 9 wherein the optical return-to-zero signal is an optical differential return-to-zero signal.

11. The system of claim 9 wherein the number of bit periods ranges from 0.4 to 1.2.

12. The system of claim 11 wherein the number of bit periods ranges from 0.6 to 1.

13. The system of claim 9 wherein each of the first input signal, the second input signal, the third input signal, the first driving signal, and the second driving signal is an electrical signal.

14. The system of claim 9 wherein the first driving signal is equal to the second driving signal multiplied by a negative number.

15. The system of claim 14 wherein the negative number is equal to −1.

* * * * *

UNITED STATES PATENT AND TRADEMARK OFFICE
CERTIFICATE OF CORRECTION

| | |
|---|---|
| PATENT NO. | : 7,734,190 B2 |
| APPLICATION NO. | : 11/344958 |
| DATED | : June 8, 2010 |
| INVENTOR(S) | : Yu Sheng Bai |

It is certified that error appears in the above-identified patent and that said Letters Patent is hereby corrected as shown below:

Column 1, line 19, delete "11/366,619" and insert -- 11/336,619 --.

Claim 1, Column 25, line 9, delete "pluses" and insert -- pulses --.

Claim 1, Column 25, line 12, delete "pluses" and insert -- pulses --.

Claim 1, Column 25, line 13, delete "pluses" and insert -- pulses --.

Claim 9, Column 26, line 4, delete "mad" and insert -- and --.

Signed and Sealed this
Twenty-eighth Day of June, 2011

David J. Kappos
*Director of the United States Patent and Trademark Office*